United States Patent
Ryu et al.

(10) Patent No.: US 11,638,263 B2
(45) Date of Patent: Apr. 25, 2023

(54) BEAMFORMED CHANNEL BUSY RATIO

(71) Applicant: QUALCOMM Incorporated, San Diego, CA (US)

(72) Inventors: Jung Ho Ryu, Fort Lee, NJ (US); Kapil Gulati, Hillsborough, NJ (US); Junyi Li, Chester, NJ (US); Sony Akkarakaran, Poway, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 1 day.

(21) Appl. No.: 16/900,463

(22) Filed: Jun. 12, 2020

(65) Prior Publication Data
US 2020/0404665 A1     Dec. 24, 2020

Related U.S. Application Data

(60) Provisional application No. 62/864,421, filed on Jun. 20, 2019.

(51) Int. Cl.
*H04W 72/04* (2009.01)
*H04W 8/26* (2009.01)
(Continued)

(52) U.S. Cl.
CPC ......... *H04W 72/0486* (2013.01); *H04W 8/26* (2013.01); *H04W 24/10* (2013.01);
(Continued)

(58) Field of Classification Search
CPC ... H04W 24/10; H04W 72/0486; H04W 8/26; H04W 72/0406; H04W 72/046; H04W 92/18
See application file for complete search history.

(56) References Cited

U.S. PATENT DOCUMENTS 8,976,677 B2 * 3/2015 Novak ................ H04W 72/085
                                                                370/431
2018/0124771 A1   5/2018 Mok et al.
(Continued)

FOREIGN PATENT DOCUMENTS

EP         3965440 A1 *  3/2022 ............ H04W 28/04
WO   WO-2017133501 A1 *  8/2017 ............ H04W 28/02
(Continued)

OTHER PUBLICATIONS

International Search Report and Written Opinion—PCT/US2020/037752—ISA/EPO—dated Sep. 23, 2020.

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment may measure a per-beam channel busy ratio (CBR) for each of one or more beams configured on the sidelink receiver for transmitting or receiving sidelink transmissions including a first CBR for a first beam that is to be used for receiving a sidelink transmission transmitted by a first sidelink transmitter; and may transmit an indication of the per-beam CBR. In some aspects, a user equipment may receive information associated with a per-beam CBR including a first CBR for a first beam to be used by a sidelink receiver for receiving a sidelink transmission transmitted by the sidelink transmitter, and may selectively transmit the sidelink transmission for reception by the sidelink transmitter using the first beam based at least in part on the indication of the per-beam CBR. Numerous other aspects are provided.

31 Claims, 15 Drawing Sheets

(51) Int. Cl.
*H04W 24/10* (2009.01)
*H04W 72/044* (2023.01)
*H04W 92/18* (2009.01)

(52) U.S. Cl.
CPC ..... *H04W 72/0406* (2013.01); *H04W 72/046* (2013.01); *H04W 92/18* (2013.01)

(56) References Cited

U.S. PATENT DOCUMENTS

| | | | |
|---|---|---|---|
| 2018/0242190 A1* | 8/2018 | Khoryaev | H04L 47/32 |
| 2019/0239112 A1* | 8/2019 | Rao | H04W 4/70 |
| 2020/0112989 A1* | 4/2020 | Zeng | H04L 5/0053 |
| 2020/0128470 A1* | 4/2020 | Mok | H04W 24/04 |
| 2020/0137539 A1* | 4/2020 | Brahmi | H04W 4/44 |
| 2020/0145867 A1* | 5/2020 | Tseng | H04W 40/22 |
| 2020/0296795 A1* | 9/2020 | Uchiyama | H04W 4/40 |
| 2021/0120583 A1* | 4/2021 | Wang | H04W 74/08 |
| 2021/0127372 A1* | 4/2021 | Li | H04L 5/0094 |
| 2021/0218511 A1* | 7/2021 | Zhang | H04W 72/0466 |
| 2021/0321343 A1* | 10/2021 | Ryu | H04L 5/005 |

FOREIGN PATENT DOCUMENTS

| | | | | |
|---|---|---|---|---|
| WO | 2018147699 A1 | 8/2018 | | |
| WO | WO-2019160973 A1 * | 8/2019 | | H04W 72/046 |
| WO | WO-2020221457 A1 * | 11/2020 | | |

\* cited by examiner

BEAMFORMED CHANNEL BUSY RATIO

CROSS-REFERENCE TO RELATED APPLICATION

This Patent Application claims priority to U.S. Provisional Patent Application No. 62/864,421, filed on Jun. 20, 2019, and entitled "BEAM FORMED CHANNEL BUSY RATIO." The disclosure of the prior Application is considered part of and is incorporated by reference into this Patent Application.

FIELD OF THE DISCLOSURE

Aspects of the present disclosure generally relate to wireless communication and to techniques and apparatuses for beamformed channel busy ratio (CBR)-based concepts for assessing channel use in a system that uses beamforming, such as a system that utilizes millimeter wave (mmW) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, a sidelink can be, for example, a communication link between a UE and another UE, or a communication link between an integrated access and backhaul (IAB) node and another IAB node. This differs from an access link, which is a communication link between a UE and a base station or a communication link between an IAB node and a base station. A wireless communication device (for example, a UE, an IAB node) that is to transmit a sidelink transmission is herein referred to as a sidelink transmitter, while a wireless communication device that is to receive a sidelink transmission is herein referred to as a sidelink receiver. Generally, when a sidelink transmitter needs to transmit a sidelink transmission to a sidelink receiver, the sidelink transmitter should take into consideration how busy the channel is when determining when/whether to transmit the sidelink transmission on the channel. In order to achieve this, the sidelink transmitter may be configured to monitor a channel busy ratio (CBR) associated with the channel. A CBR is a measurement indicative of how busy a channel is and, therefore, may indicate a probability of interference or a collision with another transmission on the channel.

In prior wireless communications systems in which CBR-based techniques for transmitting sidelink transmissions have been implemented, a CBR is defined but does not address the concept of beamforming. Thus, in a system that uses beamforming, such as a system that utilizes millimeter wave (mmW) communications, the conventional approach to using CBR is insufficient for assessing channel use. For example, a first sidelink transmitter that needs to transmit to a sidelink receiver may attempt to measure a CBR associated with a channel, but the first sidelink transmitter may not be able to sense a transmission by a second sidelink transmitter when a transmit beam used by the second sidelink transmitter is not aligned with a receive beam of the first sidelink transmitter. In other words, the CBR measurement by the first sidelink transmitter may be blind to the sidelink transmission from the second sidelink transmitter, meaning that the CBR cannot be reliably used by the first sidelink transmitter to assess how busy the channel is when determining whether to transmit the sidelink transmission to the sidelink receiver.

SUMMARY

In some aspects, a method of wireless communication, performed by a sidelink receiver, may include measuring a per-beam channel busy ratio (CBR) for each of one or more beams configured on the sidelink receiver for transmitting or receiving sidelink transmissions including a first CBR for a first beam that is to be used for receiving a sidelink transmission transmitted by a first sidelink transmitter; and transmitting an indication of the per-beam CBR for each of the one or more of the beams including the first CBR for the first beam.

In some aspects, a sidelink receiver for wireless communication may include memory and one or more processors operatively coupled to the memory. The memory and the one or more processors may be configured to measure a per-beam CBR for each of one or more beams configured on the sidelink receiver for transmitting or receiving sidelink transmissions including a first CBR for a first beam that is to be used for receiving a sidelink transmission transmitted by a first sidelink transmitter; and transmit an indication of the per-beam CBR for each of the one or more of the beams including the first CBR for the first beam.

In some aspects, a non-transitory computer-readable medium may store one or more instructions for wireless communication. The one or more instructions, when executed by one or more processors of a sidelink receiver, may cause the one or more processors to: measure a per-beam CBR for each of one or more beams configured on the sidelink receiver for transmitting or receiving sidelink transmissions including a first CBR for a first beam that is to be used for receiving a sidelink transmission transmitted by a first sidelink transmitter; and transmit an indication of the per-beam CBR for each of the one or more of the beams including the first CBR for the first beam.

In some aspects, an apparatus for wireless communication may include means for measuring a per-beam CBR for each of one or more beams configured on the sidelink receiver for transmitting or receiving sidelink transmissions including a first CBR for a first beam that is to be used for receiving a sidelink transmission transmitted by a first sidelink transmitter; and means for transmitting an indication of the per-beam CBR for each of the one or more of the beams including the first CBR for the first beam.

In some aspects, a method of wireless communication, performed by a sidelink transmitter, may include receiving an indication of a per-beam CBR including a first CBR for a first beam to be used by a sidelink receiver for receiving a sidelink transmission transmitted by the sidelink transmitter; and selectively transmitting the sidelink transmission for reception by sidelink receiver using the first beam based at least in part on the indication of the per-beam CBR.

In some aspects, a sidelink transmitter for wireless communication may include memory and one or more processors operatively coupled to the memory. The memory and the one or more processors may be configured to receive an indication of a per-beam CBR including a first CBR for a first beam to be used by a sidelink receiver for receiving a sidelink transmission transmitted by the sidelink transmitter; and selectively transmit the sidelink transmission for reception by sidelink receiver using the first beam based at least in part on the indication of the per-beam CBR.

In some aspects, a non-transitory computer-readable medium may store one or more instructions for wireless communication. The one or more instructions, when executed by one or more processors of a sidelink transmitter, may cause the one or more processors to: receive an indication of a per-beam CBR including a first CBR for a first beam to be used by a sidelink receiver for receiving a sidelink transmission transmitted by the sidelink transmitter; and selectively transmit the sidelink transmission for reception by sidelink receiver using the first beam based at least in part on the indication of the per-beam CBR.

In some aspects, an apparatus for wireless communication may include means for receiving an indication of a per-beam CBR including a first CBR for a first beam to be used by a sidelink receiver for receiving a sidelink transmission transmitted by the apparatus; and means for selectively transmitting the sidelink transmission for reception by sidelink receiver using the first beam based at least in part on the indication of the per-beam CBR.

In some aspects, a method of wireless communication, performed by a sidelink receiver, may include receiving a sidelink transmission transmitted by a sidelink transmitter; and transmitting a busy signal based at least in part on receiving the sidelink transmission from the sidelink transmitter, the busy signal indicating that a channel associated with the sidelink transmission is busy or is occupied, and the busy signal being transmitted in a time period during which the sidelink receiver is receiving the sidelink transmission from the sidelink transmitter.

In some aspects, a sidelink receiver for wireless communication may include memory and one or more processors operatively coupled to the memory. The memory and the one or more processors may be configured to receive a sidelink transmission transmitted by a sidelink transmitter; and transmit a busy signal based at least in part on receiving the sidelink transmission from the sidelink transmitter, the busy signal indicating that a channel associated with the sidelink transmission is busy or is occupied, and the busy signal being transmitted in a time period during which the sidelink receiver is receiving the sidelink transmission from the sidelink transmitter.

In some aspects, a non-transitory computer-readable medium may store one or more instructions for wireless communication. The one or more instructions, when executed by one or more processors of a sidelink receiver, may cause the one or more processors to: receive a sidelink transmission transmitted by a sidelink transmitter; and transmit a busy signal based at least in part on receiving the sidelink transmission from the sidelink transmitter, wherein the busy signal indicating that a channel associated with the sidelink transmission is busy or is occupied, and the busy signal being transmitted in a time period during which the sidelink receiver is receiving the sidelink transmission from the sidelink transmitter.

In some aspects, an apparatus for wireless communication may include means for receiving a sidelink transmission transmitted by a sidelink transmitter; and means for transmitting a busy signal based at least in part on receiving the sidelink transmission from the sidelink transmitter, the busy signal indicating that a channel associated with the sidelink transmission is busy or is occupied, and the busy signal being transmitted in a time period during which the sidelink receiver is receiving the sidelink transmission from the sidelink transmitter.

In some aspects, a method of wireless communication, performed by a sidelink transmitter, may include receiving a busy signal using a beam associated with a sidelink transmission received by a sidelink receiver, the busy signal indicating that a channel associated with the sidelink transmission is busy or is occupied, and the busy signal being received in a time period during which the sidelink receiver is receiving the sidelink transmission; and selectively transmitting, based at least in part on the busy signal associated with the sidelink transmission, another sidelink transmission to another sidelink receiver using the beam.

In some aspects, a sidelink transmitter for wireless communication may include memory and one or more processors operatively coupled to the memory. The memory and the one or more processors may be configured to receive a busy signal using a beam associated with a sidelink transmission received by a sidelink receiver, the busy signal indicating that a channel associated with the sidelink transmission is busy or is occupied, and the busy signal being received in a time period during which the sidelink receiver is receiving the sidelink transmission; and selectively transmit, based at least in part on the busy signal associated with the sidelink transmission, another sidelink transmission to another sidelink receiver using the beam.

In some aspects, a non-transitory computer-readable medium may store one or more instructions for wireless communication. The one or more instructions, when executed by one or more processors of a sidelink transmitter, may cause the one or more processors to: receive a busy signal using a beam associated with a sidelink transmission received by a sidelink receiver, the busy signal indicating that a channel associated with the sidelink transmission is busy or is occupied, and the busy signal being received in a time period during which the sidelink receiver is receiving the sidelink transmission; and selectively transmit, based at least in part on the busy signal associated with the sidelink transmission, another sidelink transmission to another sidelink receiver using the beam.

In some aspects, an apparatus for wireless communication may include means for receiving a busy signal using a beam associated with a sidelink transmission received by a sidelink receiver, the busy signal indicating that a channel associated with the sidelink transmission is busy or is occupied, and the busy signal being received in a time period during which the sidelink receiver is receiving the sidelink transmission; and means for selectively transmitting, based at least in part on the busy signal associated with the sidelink transmission, another sidelink transmission to another sidelink receiver using the beam.

In some aspects, a method of wireless communication, performed by a sidelink device, may include identifying a set of beams associated with communicating sidelink transmissions; and determining a set of per-beam channel busy ratios (CBRs), each CBR corresponding to one of the set of beams.

In some aspects, a sidelink device for wireless communication may include memory and one or more processors operatively coupled to the memory. The memory and the one or more processors may be configured to identify a set of beams associated with communicating sidelink transmissions; and determine a set of per CBRs, each CBR corresponding to one of the set of beams.

In some aspects, a non-transitory computer-readable medium may store one or more instructions for wireless communication. The one or more instructions, when executed by one or more processors of a sidelink device, may cause the one or more processors to: identify a set of beams associated with communicating sidelink transmissions; and determine a set of per-beam CBRs, each CBR corresponding to one of the set of beams.

In some aspects, an apparatus for wireless communication may include means for identifying a set of beams associated with communicating sidelink transmissions; and means for determining a set of per-beam CBRs, each CBR corresponding to one of the set of beams.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
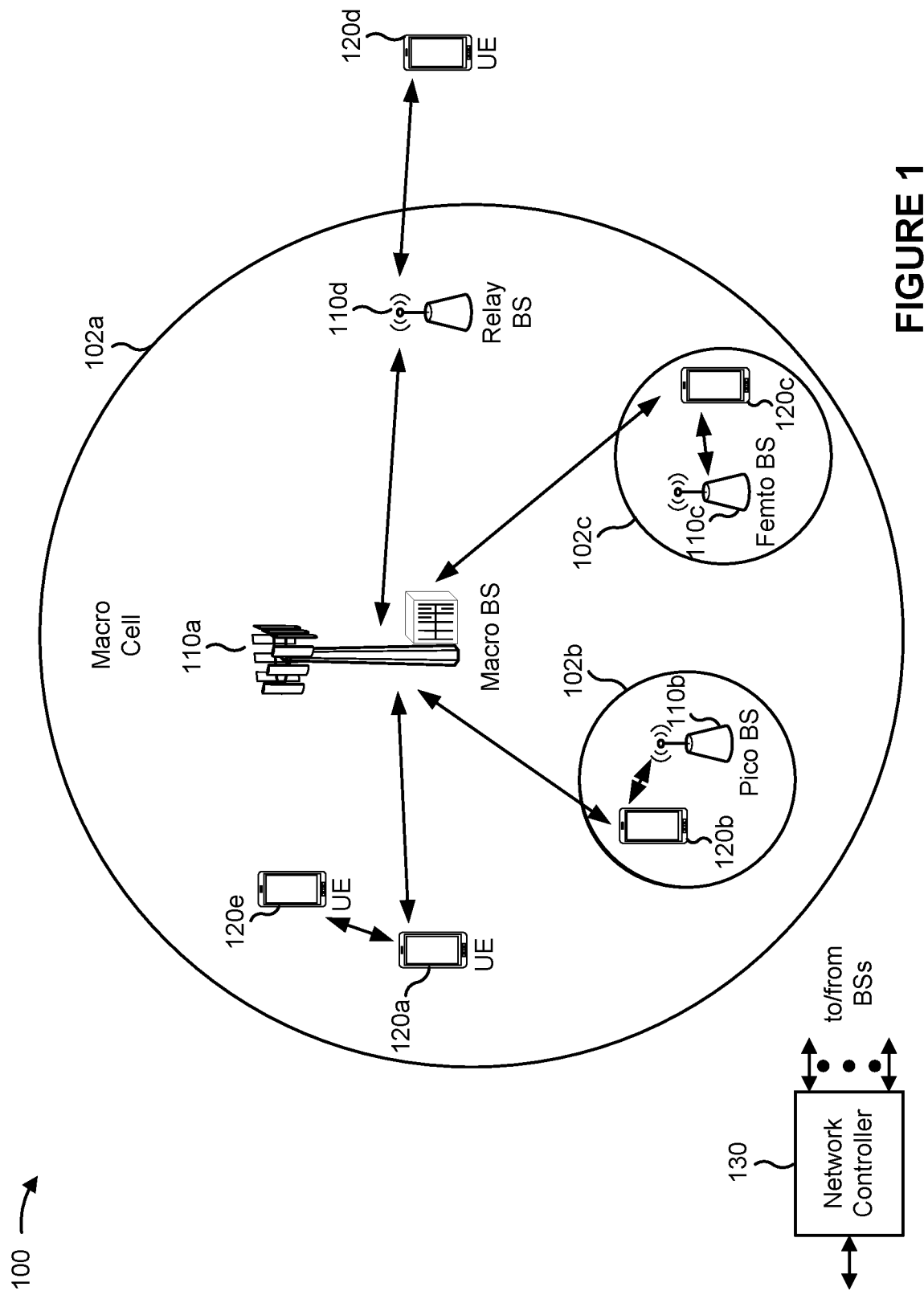
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

In a wireless network, a sidelink can be, for example, a communication link between a user equipment (UE) and another UE, or a communication link between an integrated access backhaul (IAB) node and another IAB node. This differs from an access link, which is a communication link between a UE and a base station or a communication link between an IAB node and a base station. A wireless communication device (for example, a UE, an IAB node) that is to transmit a sidelink transmission is herein referred to as a sidelink transmitter, while a wireless communication device that is to receive a sidelink transmission is herein referred to as a sidelink receiver.

Generally, if a channel to be used for a sidelink transmission is busy, then the sidelink transmission may cause interference with or may collide with another transmission on the channel. Thus, when a sidelink transmitter needs to transmit a sidelink transmission to a sidelink receiver, the sidelink transmitter should take into consideration how busy the channel is when determining when/whether to transmit the sidelink transmission on the channel. In order to achieve this, the sidelink transmitter may be configured to monitor a channel busy ratio (CBR) associated with the channel. A CBR is a measurement indicative of how busy a channel is and, therefore, may indicate a probability of interference or of a collision with another transmission on the channel. A relatively high CBR may indicate that the channel is being frequently used for transmissions, meaning that a probability of interference or collision is relatively high. A relatively low CBR may indicate that the channel is not being used frequently, meaning that a probability of interference or collision is relatively low.

In prior wireless communications systems in which CBR-based techniques have been implemented, such as a Long Term Evolution (LTE) vehicle-to-anything (V2X) system, a CBR is defined but does not address the concept of beamforming. Thus, in a system that uses beamforming (for example, a New Radio (NR) system that uses millimeter wave (mmW)) the conventional approach to using CBR may be insufficient for assessing channel use. For example, a first sidelink transmitter that needs to transmit to a first sidelink receiver may attempt to measure a CBR associated with a channel, but the first sidelink transmitter may not be able to sense a transmission by a second sidelink transmitter (for a transmission to a second sidelink receiver) when a transmit beam used by the second sidelink transmitter is not aligned with (for example, not oriented in a same direction so as to be overlapping) a receive beam of the first sidelink transmitter. In other words, the CBR measurement by the first sidelink transmitter may not account for the sidelink transmission from the second sidelink transmitter, meaning that the CBR cannot be reliably used to assess how busy the channel is.

Some aspects described herein provide techniques and apparatuses for beamformed CBR. In some aspects, a sidelink receiver may measure a per-beam CBR corresponding to a beam to be used for receiving a sidelink transmission transmitted by a sidelink transmitter, and may transmit indication of the per-beam CBR to the sidelink transmitter. Here, the sidelink transmitter may receive the indication of the per-beam CBR, and may selectively transmit the sidelink transmission for reception by the sidelink receiver using the beam based at least in part on the indication of the per-beam CBR. In some aspects, a sidelink receiver may receive a sidelink transmission transmitted by a sidelink transmitter, and may transmit a busy signal while receiving the sidelink transmission from the sidelink transmitter. Here, another sidelink transmitter may receive the busy signal using a beam associated with the sidelink transmission, and may selectively transmit another sidelink transmission to another sidelink receiver using the beam based at least in part on the busy signal. Additional details and examples are described below.

FIG. 1 is a block diagram illustrating an example wireless network 100 in accordance with various aspects of the present disclosure. The wireless network 100 may be a LTE network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
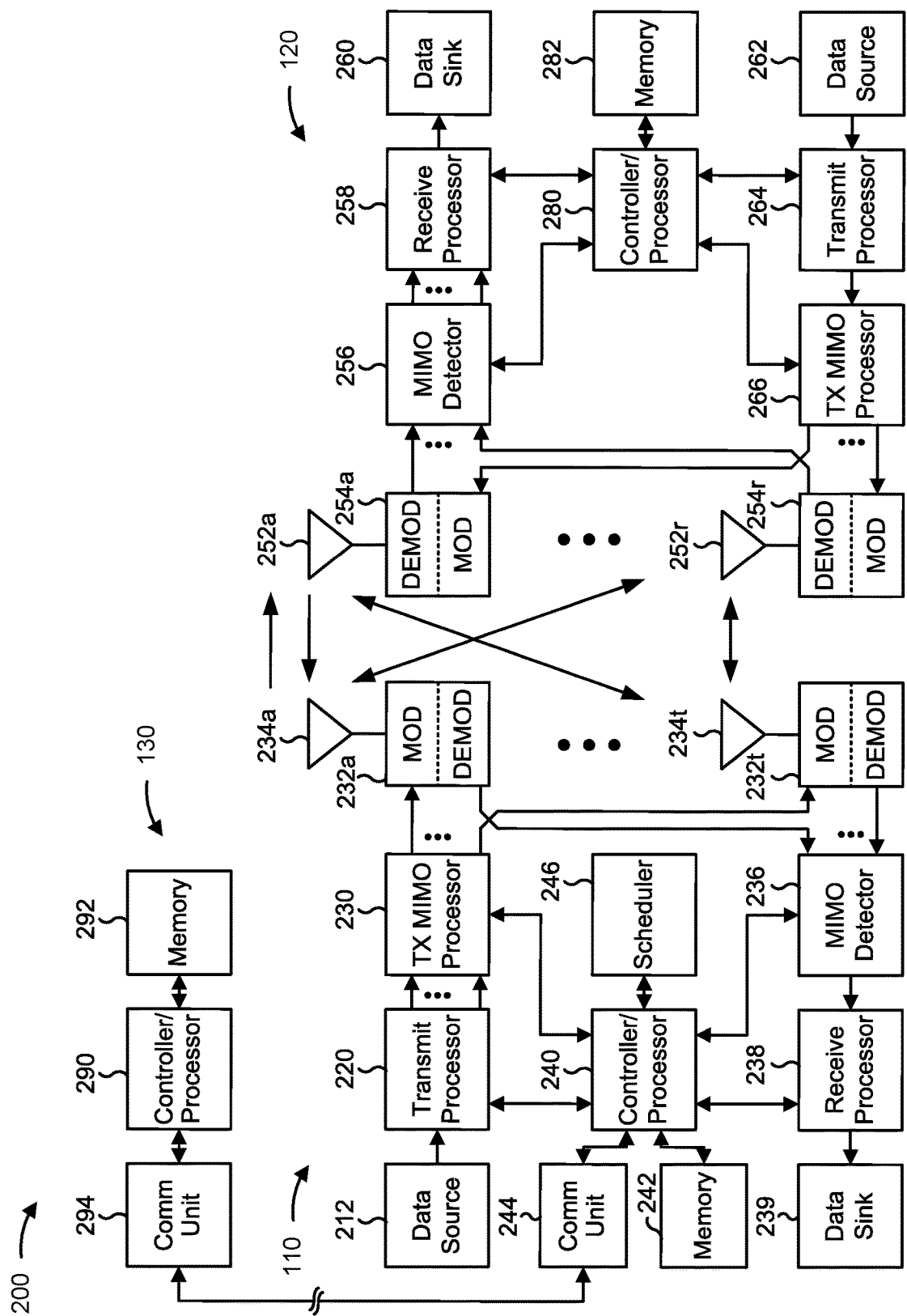
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with beamformed CBR, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for measuring a per-beam CBR for each of one or more beams configured on the sidelink receiver for transmitting or receiving sidelink transmissions including a first CBR for a first beam that is to be used for receiving a sidelink transmission transmitted by a first sidelink transmitter; means for transmitting an indication of the per-beam CBR for each of the one or more of the beams including the first CBR for the first beam; or the like, or combinations thereof. In some aspects, such means may include one or more components of UE 120 described in connection with FIG. 2.

In some aspects, UE 120 may include means for receiving an indication of a per-beam CBR including a first CBR for a first beam to be used by a sidelink receiver for receiving a sidelink transmission transmitted by the sidelink transmitter; means for selectively transmitting the sidelink transmission to the sidelink receiver by the sidelink transmitter using the first beam based at least in part on the indication of the per-beam CBR; or the like, or combinations thereof. In some aspects, such means may include one or more components of UE 120 described in connection with FIG. 2.

In some aspects, UE 120 may include means for receiving a sidelink transmission transmitted by a sidelink transmitter; means for transmitting a busy signal based at least in part on receiving the sidelink transmission from the sidelink transmitter, the busy signal indicating that a channel associated with the sidelink transmission is busy or is occupied, and the busy signal being transmitted in a time period during which the sidelink receiver is receiving the sidelink transmission from the sidelink transmitter; or the like, or combinations thereof. In some aspects, such means may include one or more components of UE 120 described in connection with FIG. 2.

In some aspects, UE 120 may include means for receiving a busy signal using a beam associated with a sidelink transmission received by a sidelink receiver, the busy signal indicating that a channel associated with the sidelink transmission is busy or is occupied, and the busy signal being received in a time period during which the sidelink receiver is receiving the sidelink transmission; means for selectively transmitting, based at least in part on the busy signal associated with the sidelink transmission, another sidelink transmission to another sidelink receiver using the beam; or the like, or combinations thereof. In some aspects, such means may include one or more components of UE 120 described in connection with FIG. 2.

In some aspects, UE 120 may include means for identifying a set of beams associated with communicating sidelink transmissions; means for determining a set of per-beam CBRs, each CBR corresponding to one of the set of beams; or the like, or combinations thereof. In some aspects, such means may include one or more components of UE 120 described in connection with FIG. 2.

In a wireless network, a sidelink can be, for example, a communication link between a UE and another UE, or a communication link between an IAB node and another IAB node. This differs from an access link, which is a communication link between a UE and a base station or a communication link between an IAB node and a base station. A wireless communication device (for example, a UE, an IAB node) that is to transmit a sidelink transmission is herein referred to as a sidelink transmitter, while a wireless communication device that is to receive a sidelink transmission is herein referred to as a sidelink receiver.

Generally, if a channel to be used for a sidelink transmission is busy, then the sidelink transmission may cause interference with or may collide with another transmission on the channel. Thus, when a sidelink transmitter needs to transmit a sidelink transmission to a sidelink receiver, the sidelink transmitter should take into consideration how busy the channel is when determining when/whether to transmit the sidelink transmission on the channel. In order to achieve this, the sidelink transmitter may be configured to monitor a CBR associated with the channel. A CBR is a measurement indicative of how busy a channel is and, therefore, may indicate a probability of interference or a collision with another transmission on the channel. A relatively high CBR may indicate that the channel is being frequently used for transmissions, meaning that a probability of interference or a collision is relatively high. A relatively low CBR may indicate that the channel is not being used frequently, meaning that a probability of interference or a collision is relatively low.

In prior wireless communications systems in which CBR-based techniques have been implemented, such as an LTE V2X system, a CBR is defined but does not address the concept of beamforming. Thus, in a system that uses beamforming (for example, an NR system that uses mmW) the conventional approach to CBR may be insufficient for assessing channel use. For example, a first sidelink transmitter that needs to transmit to a first sidelink receiver may attempt to measure a CBR associated with a channel, but the first sidelink transmitter may not be able to sense a transmission by a second sidelink transmitter (for a transmission to a second sidelink receiver) when a transmit beam used by the second sidelink transmitter is not aligned with a receive beam of the first sidelink transmitter. In other words, the CBR measurement by the first sidelink transmitter may not account for the sidelink transmission from the second sidelink transmitter, meaning that the CBR cannot be reliably used to assess how busy the channel is.

Some aspects described herein provide techniques and apparatuses for beamformed CBR. In some aspects, a sidelink receiver may measure a per-beam CBR corresponding to a beam to be used for receiving a sidelink transmission transmitted by a sidelink transmitter, and may transmit indication of the per-beam CBR to the sidelink transmitter. Here, the sidelink transmitter may receive the indication of the per-beam CBR, and may selectively transmit the sidelink transmission for reception by the sidelink receiver using the beam based at least in part on the indication of the per-beam CBR. In some aspects, a sidelink receiver may receive a sidelink transmission transmitted by a sidelink transmitter, and may transmit a busy signal while receiving the sidelink transmission from the sidelink transmitter. Here, another sidelink transmitter may receive the busy signal using a beam associated with the sidelink transmission, and may selectively transmit another sidelink transmission to another sidelink receiver using the beam based at least in part on the busy signal. Additional details and examples are described below.

Figure 3:
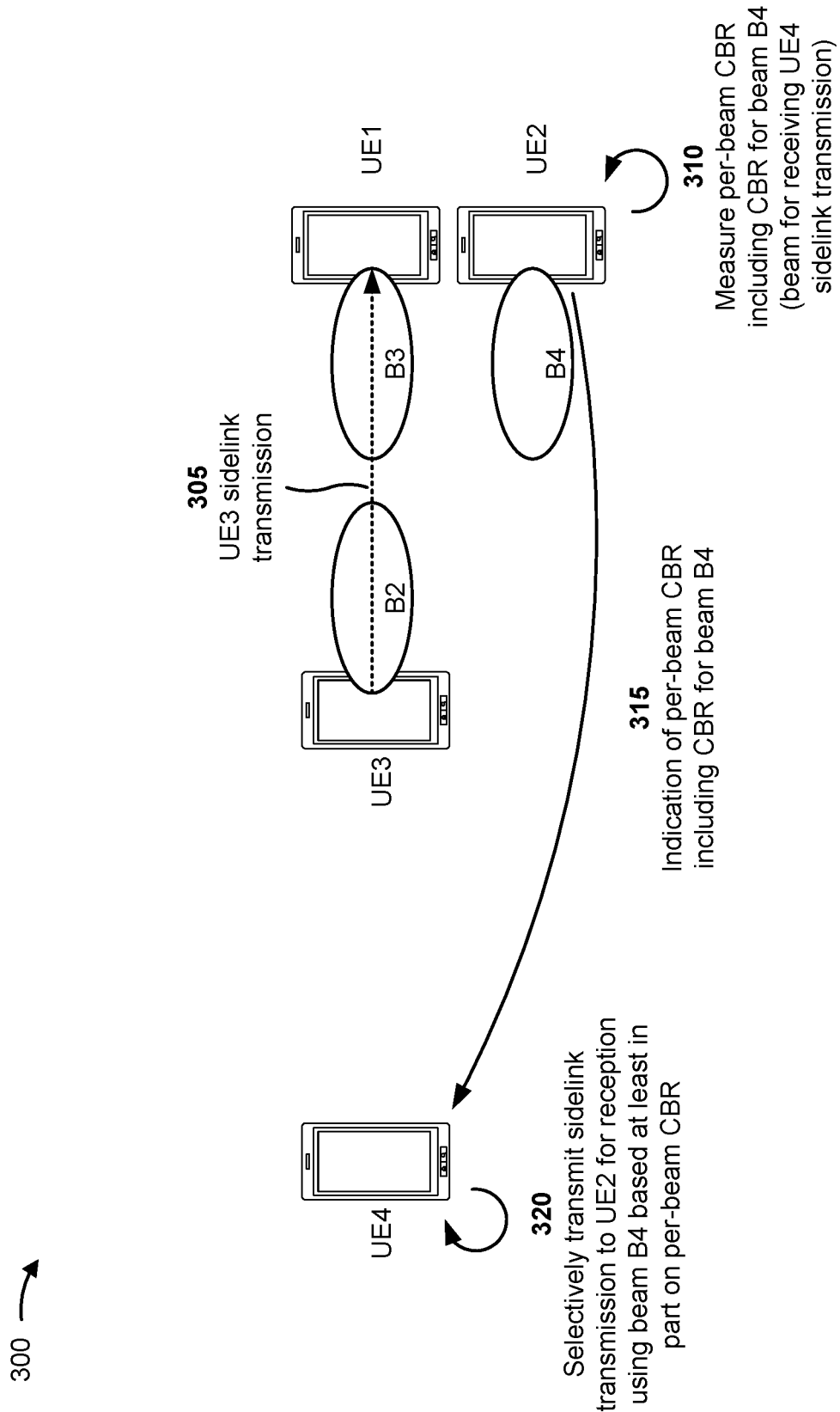
FIGS. 3-5 are diagrams illustrating examples associated with beamformed channel busy ratios (CBRs) in accordance with various aspects of the present disclosure.
Figure 4:
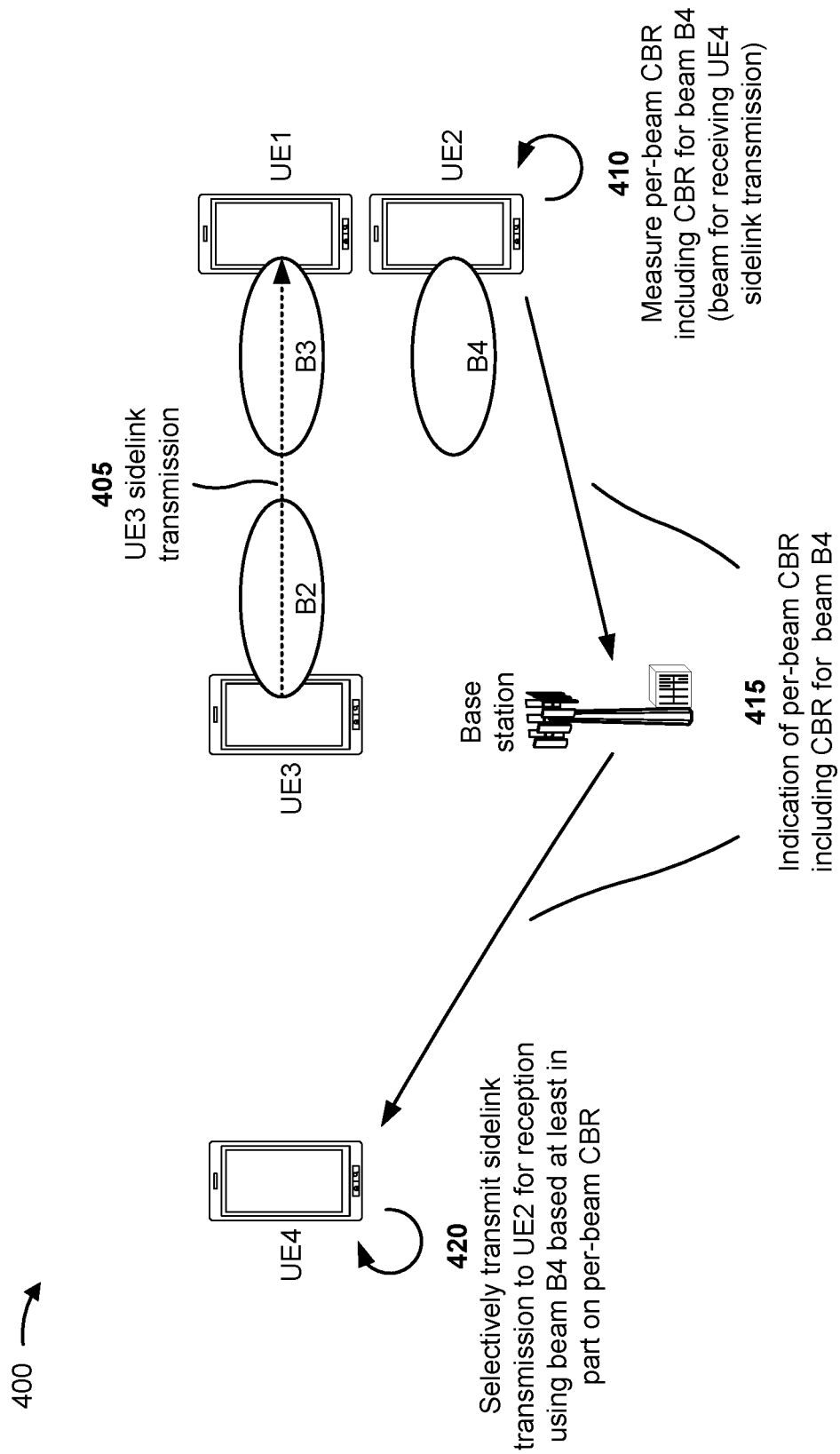
Figure 5:
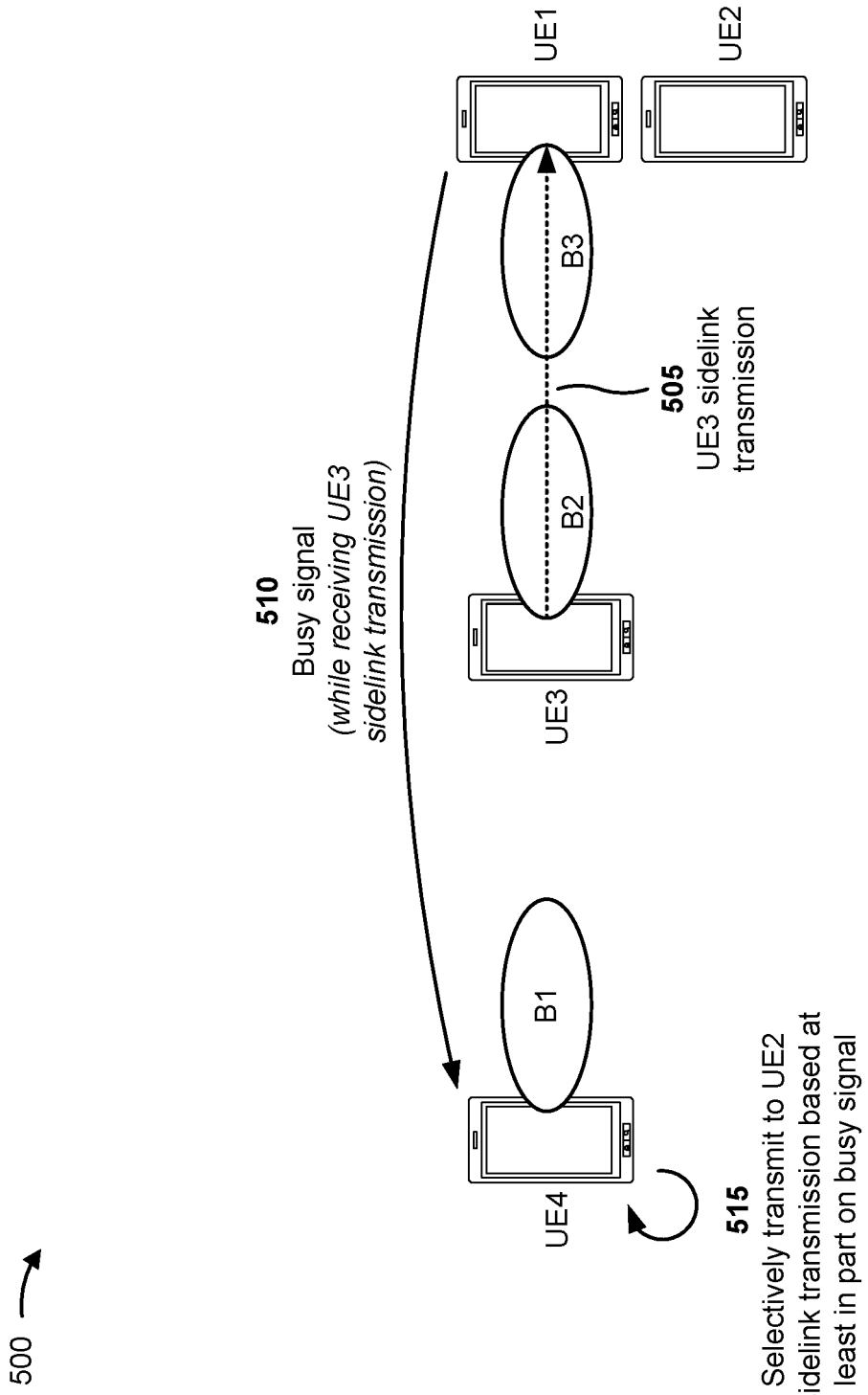

FIGS. 3-5 are diagrams illustrating examples associated with beamformed CBR in accordance with various aspects of the present disclosure.

FIG. 3 illustrates an example aspect 300 for beamformed CBR that can be used when, for example, the sidelink transmitter and sidelink receiver are out of coverage (in other words, not connected to a base station 110 via respective access links).

As shown in FIG. 3, in a first operation 305, sidelink transmitter UE3 (for example, a UE 120) transmits a sidelink transmission to sidelink receiver UE1 (for example, a UE 120). As shown, sidelink transmitter UE3 transmits the sidelink transmission using a beamformed beam B2, and sidelink receiver UE1 receives the sidelink transmitter using a beamformed beam B3. In this example, sidelink transmitter UE4 (for example, a UE 120) needs to transmit a sidelink transmission to sidelink receiver UE2 (for example, a UE 120). Notably, if sidelink transmitter UE4 were to attempt to measure a CBR associated with the channel using a beamformed receive beam, sidelink transmitter UE4 would not be able to sense the transmission by sidelink transmitter UE3 because beam B2 would not be aligned with the receive beam of sidelink transmitter UE4.

As further shown in FIG. 3, in a second operation 310, sidelink receiver UE2 may measure a per-beam CBR corresponding to a beam to be used for receiving a sidelink transmission transmitted by the sidelink transmitter UE4 (for example, beamformed beam B4). A per-beam CBR is a CBR specific to beam to be used for receiving a sidelink transmission. In this example, the per-beam CBR is a CBR specific to the receive beam (beam B4) for receiving the sidelink transmission from sidelink transmitter UE4. In some aspects, the per-beam CBR includes one or more CBRs associated with or more beams configured on the sidelink receiver UE2 for transmitting or receiving sidelink transmissions. Here, the per-beam CBR includes a CBR for a beam to be used for receiving a sidelink transmission transmitted by the sidelink transmitter UE4.

In some aspects, a sidelink device (for example, a sidelink receiver or a sidelink transmitter) may be configured with a set of n (n≥1) beams associated with communicating (in other words, transmitting or receiving) sidelink transmissions. In some aspects, when measuring a per-beam CBR, the sidelink device may measure how busy a channel is for each of the set of n configured beams during a particular set of time slots (for example, time slots t-100 to t-1). When performing these measurements, the sidelink device may, in each of the set of time slots, receive or sense any signal using each of the set of n beams. Generally, if a measurement (for example, a reference signal received power (RSRP)) associated with a given beam satisfies a configured threshold, then the sidelink device may determine that the channel is busy on that beam. As indicated, in some aspects, the sidelink device may determine a per-beam CBR for one or more of the set of n beams. For example, the sidelink device may identify the set of n beams associated with communicating sidelink transmissions, and may determine a set of n per-beam CBRs, each CBR corresponding to one of the set of n beams. In the example shown in FIG. 3, beam B4 is one of the n beams configured on sidelink receiver UE2. Therefore, sidelink receiver UE2 may measure the per-beam CBR corresponding to beam B4.

As further shown in FIG. 3, in a third operation 315, sidelink receiver UE2 may transmit information associated with the per-beam CBR. In some aspects, sidelink receiver UE2 may transmit the information associated with the per-beam CBR (directly) to sidelink transmitter UE4 (in other words, the sidelink transmitter from which the sidelink transmission is to be received). The information associated with the per-beam CBR may be, for example, an indication of the per-beam CBR, feedback information based on the per-beam CBR, or another item of information that provides information indicative of a result of the measurement of the per-beam CBR. In some aspects, the per-beam CBR may include a CBR for each of one or more of the beams, including the CBR for the beam. In some aspects, the sidelink receiver UE2 may transmit the information associated with the per-beam CBR (such as the indication of the per-beam CBR) to a set of sidelink transmitters including the sidelink transmitter UE4. That is, in some aspects, the sidelink receiver UE2 may transmit the per-beam CBR to multiple sidelink transmitters. In some aspects, the sidelink receiver UE2 may transmit a set of UE identifiers corresponding to the set of sidelink transmitters that are to receive the indication of the per-beam CBR. In some aspects, the sidelink receiver UE2 may transmit a UE identifier of the sidelink receiver UE2 or and a beam identifier of the per-beam CBR with the indication of the per-beam CBR.

In some aspects, sidelink receiver UE2 may transmit the information associated with the per-beam CBR using beam B4 (in other words, the beam associated with the CBR). In some aspects, sidelink receiver UE2 may be configured to measure and/or transmit the per-beam CBR (automatically) on a periodic basis.

In some aspects, a of measurement of the per-beam CBR or a transmission of the indication of the per-beam CBR may depend on the beam. That is, in some aspects, the periodicity of the measurement of the per-beam CBR or the transmission of the indication of the per-beam CBR may be different depending on the beam.

In some aspects, sidelink receiver UE2 may transmit the information associated with the per-beam CBR in a set of time-frequency resources that corresponds to beam B4. Here, both sidelink receiver UE2 and sidelink transmitter UE4 may be configured with information associating the set of time-frequency resources with beam B4. Therefore, upon receiving the per-beam CBR in the set of time-frequency resources, sidelink transmitter UE4 may determine that the received per-beam CBR corresponds to beam B4. In some aspects, sidelink receiver UE1, sidelink receiver UE2, sidelink transmitter UE3, and sidelink transmitter UE4 may have common timing (for example, determined from, for example, a global positioning system (GPS) signal).

As further shown in FIG. 3, in a fourth operation 320, sidelink transmitter UE4 may receive the information associated with the per-beam CBR associated with beam B4, and may selectively transmit the sidelink transmission for reception by sidelink receiver UE2 using beam B4. In some aspects, as shown in FIG. 3, sidelink transmitter UE4 may receive the information associated with the per-beam CBR (directly) from sidelink receiver UE2 (for example, since both sidelink transmitter UE4 and sidelink receiver UE2 are out of coverage). In some aspects, sidelink transmitter UE4 may receive the information associated with the per-beam CBR on a periodic basis and/or in a set of time-frequency resources that corresponds to beam B4, as described above.

In some aspects, sidelink transmitter UE4 may selectively transmit the sidelink transmission based at least in part on the information associated with the per-beam CBR. For example, sidelink transmitter UE4 may use the per-beam CBR and information associated with a priority of the sidelink transmission (for example, proximity service (ProSe) per packet priority) to determine whether to transmit the sidelink transmission in a next sidelink slot, and may proceed accordingly.

In some aspects, the per-beam CBR may include a plurality of CBRs for the beam, each associated with a different threshold. That is, in some aspects, the beam may be associated with multiple thresholds. Thus, for a given CBR associated with the beam, an associated threshold may low. This may cause a measurement indicating a lower power received signal as indicating busyness. A lower power threshold may be useful, for example, in the case of a wide beam (since a wide beam is not able to receive a signal with a high RSRP because the wide beam has a lower beam forming gain than a narrow beam). Thus, the CBR associated with the low threshold may be used or a wide beam. Conversely, a CBR associated with high threshold may be used for a narrow beam. In some aspects, each beam configured on the sidelink receiver UE2 may be associated with a different threshold (depending on a footprint of the beam).

In some aspects, when there are multiple CBRs associated with the beam, the transmitted indication of the per-beam CBR may include an indication of each of the multiple CBRs, or alternatively may include an indication of a subset of the multiple CBRs. In some aspects, the subset of CBRs may be selected from the multiple CBRs based at least in part on, for example, an instruction received from a base station, a priority of the sidelink transmission, or a priority of the sidelink transmitter UE4. Thus, in some aspects when there are multiple CBRs with different thresholds, the sidelink receiver UE2 may transmit all of the CBRS or only a selected few. As an example, if the sidelink transmitter UE4 is a high priority sidelink transmitter, then the sidelink transmitter UE4 may use a higher threshold CBR to decide whether to transmit the sidelink transmission (since the higher threshold is less likely to indicate the channel is busy). In such, a case, the indication of the per-beam CBR transmitted by the sidelink receiver UE2 may include information associated with the CBR associated with the higher threshold.

In some aspects, the per-beam CBR may include a plurality of CBRs, each of which are associated with a different beam, and each beam may be associated with a different threshold.

FIG. 4 illustrates an example aspect 400 for beamformed CBR that can be used when, for example, the sidelink transmitter and sidelink receiver are in coverage (in other words, connected to a base station 110 via respective access links).

As shown in FIG. 4, in a first operation 405, sidelink transmitter UE3 (for example, a UE 120) transmits a sidelink transmission to sidelink receiver UE1 (for example, a UE 120). As shown, sidelink transmitter UE3 transmits the sidelink transmission using a beamformed beam B2, and sidelink receiver UE1 receives the sidelink transmitter using a beamformed beam B3. In this example, sidelink transmitter UE4 (for example, a UE 120) needs to transmit a sidelink transmission to sidelink receiver UE2 (for example, a UE 120), similar to the example described above in association with FIG. 3.

As further shown in FIG. 4, in a second operation 410, sidelink receiver UE2 may measure a per-beam CBR corresponding to a beam to be used for receiving a sidelink transmission transmitted by the sidelink transmitter UE4 (for example, beamformed beam B4). In some aspects, sidelink receiver UE2 may measure the per-beam CBR in the manner described above in association with FIG. 3.

As further shown in FIG. 4, in a third operation 415, sidelink receiver UE2 may transmit information associated with the per-beam CBR. In some aspects, sidelink receiver UE2 may transmit the information associated with the per-beam CBR to a base station (for example, base station 110) configured to relay the information associated with the per-beam CBR to sidelink transmitter UE4. In other words, in some aspects, sidelink receiver UE2 may transmit the information associated with the per-beam CBR to the base station via a first access link such that the base station can forward the information associated with the per-beam CBR to sidelink transmitter UE4 via a second access link.

In some aspects, sidelink receiver UE2 may measure and transmit the per-beam CBR based at least in part on an indication from the base station that sidelink receiver UE2 is to receive the sidelink transmission from sidelink transmitter UE4. For example, sidelink transmitter UE4 may provide an indication to the base station that sidelink transmitter UE4 needs to transmit the sidelink transmission to sidelink receiver UE2. Here, the base station may receive the indication, and may provide to sidelink receiver UE2 an indication that the sidelink receiver UE2 is to receive the sidelink transmission from sidelink transmitter UE4. In this example, sidelink receiver UE2 may measure and transmit the per-beam CBR based at least in part on the indication from the base station. In some aspects, the indication may identify the beam for which the per-beam CBR is to be measured, and sidelink receiver UE2 may measure and transmit the per-beam CBR, accordingly.

As further shown in FIG. 4, in a fourth operation 420, sidelink transmitter UE4 may receive the information associated with the per-beam CBR associated with beam B4, and may selectively transmit the sidelink transmission for reception by sidelink receiver UE2 using beam B4. In some aspects, as shown in FIG. 4, sidelink transmitter UE4 may receive the information associated with the per-beam CBR from the base station configured to relay the information associated with the per-beam CBR from sidelink receiver UE2. In some aspects, sidelink transmitter UE4 may selectively transmit the sidelink transmission in the manner described in association with FIG. 3.

FIG. 5 illustrates an example aspect 500 for beamformed CBR that utilizes a busy signal transmitted by a sidelink receiver while receiving a sidelink transmitter.

As shown in FIG. 5, in a first operation 505, sidelink transmitter UE3 (for example, a UE 120) transmits a sidelink transmission to sidelink receiver UE1 (for example, a UE 120). As shown, sidelink transmitter UE3 transmits the sidelink transmission using a beamformed beam B2, and sidelink receiver UE1 receives the sidelink transmitter using a beamformed beam B3. In this example, sidelink transmitter UE4 (for example, a UE 120) needs to transmit a sidelink transmission to sidelink receiver UE2 (for example, a UE 120), similar to the example described above in association with FIG. 3.

As further shown in FIG. 5, in a second operation 510, sidelink receiver UE1 may transmit a busy signal while receiving the sidelink transmission from sidelink transmitter UE3. The busy signal is a signal indicating that a channel associated with a sidelink transmission is busy or occupied. In some aspects, sidelink receiver UE1 may transmit the busy signal in a time period during which sidelink receiver UE1 is receiving the sidelink transmission from sidelink transmitter UE3. In some aspects, as described in further detail below, if another sidelink device (for example, sidelink transmitter UE4) receives the busy signal on a given beam, then the sidelink device may determine that the channel on that beam is busy or occupied with another sidelink transmitter.

In some aspects, a frequency of the busy signal may indicate a frequency band associated with the sidelink transmission. For example, a busy signal on a particular frequency may indicate that a current sidelink transmission is being received on a particular physical resource block (PRB). In this way, the busy signal may convey information that identifies which frequency band is being used for the sidelink transmission. In some aspects, a codeword or a sequence transmitted in the busy signal may indicate occupancy of a set of resources of a frequency band associated with the sidelink transmission. For example, a first codeword (for example, 101010) may be used to indicate occupancy of a first PRB, while a second codeword (for example, 010101) may be used to indicate occupancy of a second PRB. In general, both how busy (for example, a fraction of resource blocks (RBs) used) and a frequency band over which busy-ness of a channel is measured (for example, a range of RBs) can be indicated by some combination of a tone-index on which the busy signal is transmitted and a codeword or a sequence transmitted on the busy signal.

In some aspects, a frequency band of the busy signal may not overlap with a frequency band associated with the sidelink transmission. Alternatively, a frequency band of the busy signal may overlap with the frequency band associated with the sidelink transmission. In some aspects, the busy signal may be frequency division multiplexed with a frequency band associated with the sidelink transmission (to assist with interference management).

In some aspects, a beam or a panel on which the busy signal is transmitted may be different from a beam or a panel on which the sidelink transmission is being received. In some aspects, the busy signal is transmitted on multiple beams or on multiple panels.

In some aspects, a beam on which the busy signal is transmitted may have a different characteristic than the beam on which the sidelink transmission is received. For example, the beam on which the busy signal is transmitted may be wider than a receive beam on which the sidelink transmission is being received.

In some aspects, the busy signal may indicate a receive beam used to receive the sidelink transmission, and the receive beam may be identified with respect to a sidelink synchronization beam. For example, a busy signal transmitted on a first frequency may indicate that sidelink receiver UE1 is using a receive beam that is quasi-co-located (QCL) with a first synchronization beam, while a busy signal transmitted on a second frequency may indicate that sidelink receiver UE1 is using a receive beam that is QCL with a second synchronization beam.

In some aspects, the busy signal may indicate a direction of a receive beam used to receive the sidelink transmission. For example, a busy signal transmitted on a first frequency may indicate that sidelink receiver UE1 is using a receive beam that is oriented at 0 degrees north, while a busy signal transmitted on a second frequency may indicate that sidelink receiver UE1 is using a receive beam that is oriented at 10 degrees north-northeast.

In some aspects, the busy signal may indicate an identify of the sidelink receiver. For example, the busy signal a busy signal transmitted on a first frequency may indicate a UE identifier for sidelink receiver UE1.

As further shown in FIG. 5, in a third operation 515, sidelink transmitter UE4 may receive the busy signal using a beam associated with the sidelink transmission being received by sidelink receiver UE1, and may selectively transmit, based at least in part on the busy signal, the sidelink transmission to sidelink receiver UE2 using the beam. In some aspects, sidelink transmitter UE4 may receive the busy signal on the beam to be used for transmitting the sidelink transmission to UE2. In some aspects, as shown in FIG. 5, sidelink transmitter UE4 may receive the busy signal (directly) from sidelink receiver UE1. In some aspects, the sidelink transmitter may compute a per-beam CBR for a receive beam to be used by the sidelink receiver UE2 for receiving the sidelink transmission based at least in part on the busy signal, and may selectively transmit the sidelink transmission based at least in part on the computed per-beam CBR.

In some aspects, sidelink transmitter UE4 may selectively transmit the sidelink transmission based at least in part on the busy signal. For example, sidelink transmitter UE4 may determine information associated with the busy signal (for example, the frequency band associated with the UE3-UE1 sidelink transmission, information that identifies the receive beam used by sidelink receiver UE1 to receive the UE3-UE1 sidelink transmission, or the like) to determine whether to transmit the sidelink transmission in a next sidelink slot, and may proceed accordingly.

Figure 6:
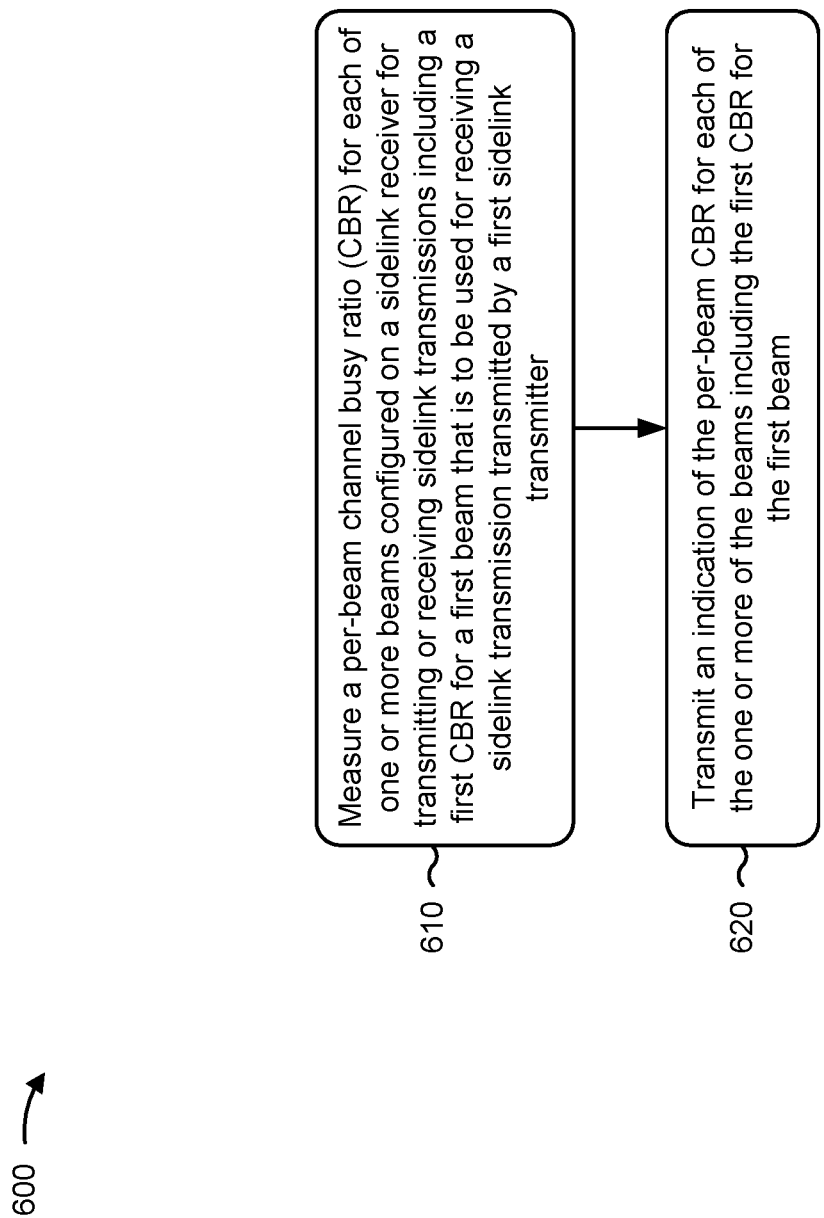
FIGS. 6-10 are diagrams illustrating example processes performed by UEs in accordance with various aspects of the present disclosure.

FIG. 6 is a diagram illustrating an example process 600 performed, for example, by a sidelink receiver, in accordance with various aspects of the present disclosure. Example process 600 is an example where a sidelink receiver (for example, UE 120) performs operations associated with beamformed CBR.

As shown in FIG. 6, in some aspects, process 600 may include measuring a per-beam CBR for each of one or more beams configured on the sidelink receiver for transmitting or receiving sidelink transmissions including a first CBR for a first beam that is to be used for receiving a sidelink transmission transmitted by a first sidelink transmitter (for example, using receive processor 258, controller/processor 280, memory 282) may measure a per-beam CBR for each of one or more beams configured on the sidelink receiver for transmitting or receiving sidelink transmissions including a first CBR for a first beam that is to be used for receiving a sidelink transmission transmitted by a first sidelink transmitter, as described above. In some aspects, the per-beam CBR is a CBR that is specific to the first beam to be used for receiving the sidelink transmission. In some aspects, the first beam is one of a set of beams, associated with communicating sidelink transmissions, that is configured on the sidelink receiver.

As further shown in FIG. 6, in some aspects, process 600 may include transmitting an indication of the per-beam CBR for each of the one or more of the beams including the first CBR for the first beam (block 620). For example, the sidelink receiver (for example, using transmit processor 264, controller/processor 280, memory 282) may transmit an indication of the per-beam CBR for each of the one or more of the beams including the first CBR for the first beam, as described above.

Process 600 may include additional aspects, such as any single aspect or any combination of aspects described below and/or in connection with one or more other processes described elsewhere herein.

In a first aspect, the indication of the per-beam CBR is transmitted using the first beam.

In a second additional aspect, alone or in combination with the first aspect, the indication of the per-beam CBR is transmitted to a set of sidelink transmitters including the first sidelink transmitter, or is transmitted to a base station configured to relay the indication of the per-beam CBR to the set of sidelink transmitters.

In a third additional aspect, alone or in combination with one or more of the first and second aspects, process 500 includes transmitting a set of UE identifiers corresponding to the set of sidelink transmitters.

In a fourth additional aspect, alone or in combination with one or more of the first through third aspects, process 500 includes transmitting a UE identifier of the sidelink receiver and a beam identifier of the per-beam CBR.

In a fifth additional aspect, alone or in combination with one or more of the first through fourth aspects, the sidelink receiver is configured to periodically measure and transmit the indication of the per-beam CBR, wherein a periodicity of the measurement of the per-beam CBR or the transmission of the indication of the per-beam CBR depends on the first beam.

In a sixth additional aspect, alone or in combination with one or more of the first through fifth aspects, transmitting the indication of the per-beam CBR comprises: determining information identifying a particular set of time-frequency resources that corresponds to the first beam, and transmitting the indication of the per-beam CBR in the particular set of time-frequency resources.

In a seventh additional aspect, alone or in combination with one or more of the first through sixth aspects, the sidelink receiver and the first sidelink transmitter have common timing.

In an eighth additional aspect, alone or in combination with one or more of the first through seventh aspects, the sidelink receiver measures and transmits the per-beam CBR based at least in part on an indication from a base station that the sidelink receiver is to receive the sidelink transmission.

In a ninth additional aspect, alone or in combination with one or more of the first through eighth aspects, the per-beam CBR includes a plurality of CBRs for the first beam, each associated with a different threshold.

In a tenth additional aspect, alone or in combination with one or more of the first through ninth aspects, the transmitted indication of the per-beam CBR includes an indication of each CBR of the plurality of CBRs.

In an eleventh additional aspect, alone or in combination with one or more of the first through tenth aspects, the transmitted indication of the per-beam CBR includes an indication of a subset of CBRs that is selected from the plurality of CBRs.

In a twelfth additional aspect, alone or in combination with one or more of the first through eleventh aspects, the subset of CBRs is selected based at least in part on at least one of: an instruction received from a base station, a priority of the sidelink transmission, or a priority of the sidelink transmitter.

In a thirteenth additional aspect, alone or in combination with one or more of the first through twelfth aspects, the first CBR is associated with a threshold selected for assessing busyness for a wide beam.

In a fourteenth additional aspect, alone or in combination with one or more of the first through thirteenth aspects, the first CBR is associated with a threshold selected for assessing busyness for a narrow beam.

In a fifteenth additional aspect, alone or in combination with one or more of the first through fourteenth aspects, the per-beam CBR includes a second CBR for a second beam of the one or more beams, wherein the first CBR is associated with a first threshold and the second CBR is associated with a second threshold that is different from the first threshold.

Figure 7:
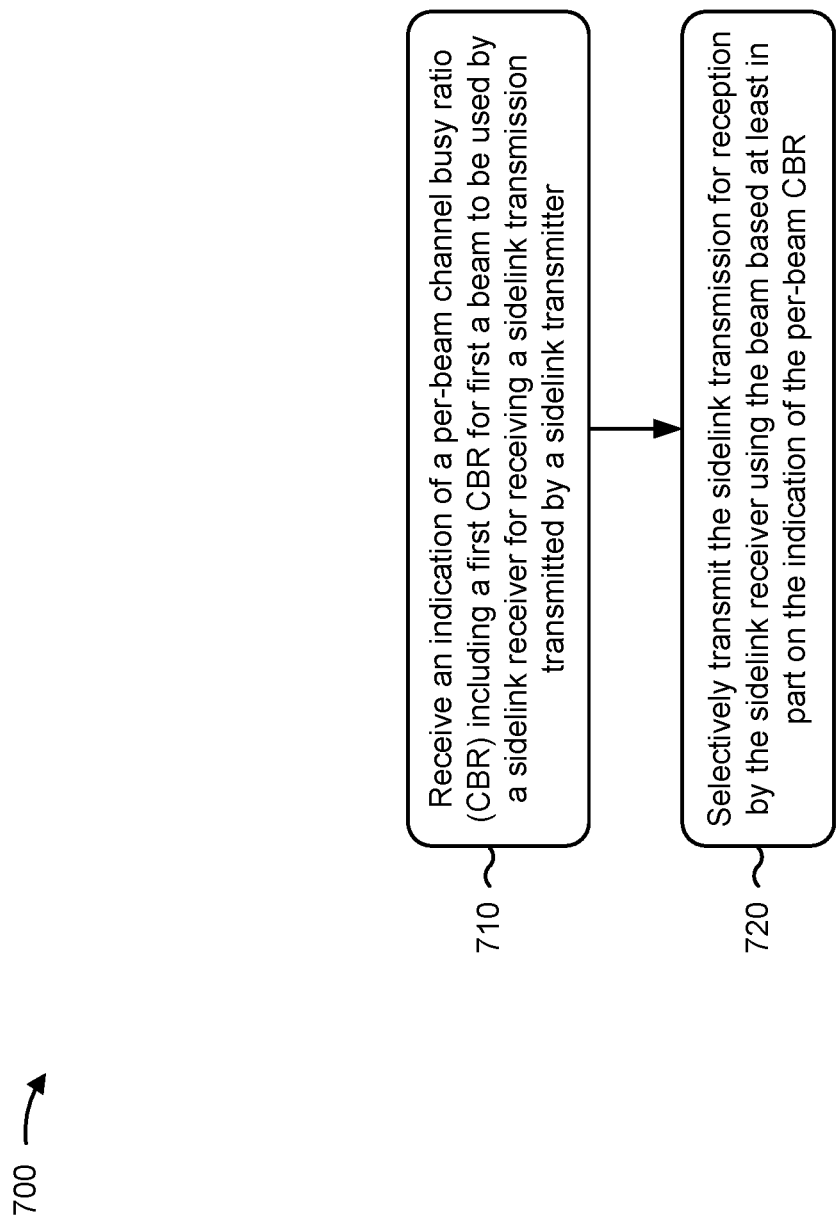

FIG. 7 is a diagram illustrating an example process 700 performed, for example, by a sidelink transmitter, in accordance with various aspects of the present disclosure. Example process 700 is an example where a sidelink transmitter (for example, UE 120) performs operations associated with beamformed CBR.

As shown in FIG. 7, in some aspects, process 700 may include receiving an indication of a per-beam CBR including a first CBR for a first beam to be used by a sidelink receiver for receiving a sidelink transmission transmitted by the sidelink transmitter (block 710). For example, the sidelink transmitter (for example, using receive processor 258, controller/processor 280, memory 282) may receive an indication of a per-beam CBR including a first CBR for a first beam to be used by a sidelink receiver for receiving a sidelink transmission transmitted by the sidelink transmitter, as described above. In some aspects, the per-beam CBR is a CBR that is specific to the beam to be used by the sidelink receiver for receiving the sidelink transmission.

As further shown in FIG. 7, in some aspects, process 700 may include selectively transmitting the sidelink transmission for reception by the sidelink receiver using the first beam based at least in part on the indication of the per-beam CBR (block 720). For example, the sidelink transmitter (for example, using transmit processor 264 controller/processor 280, memory 282) may selectively transmit the sidelink transmission for reception by the sidelink receiver using the first beam based at least in part on the indication of the per-beam CBR, as described above.

Process 700 may include additional aspects, such as any single aspect or any combination of aspects described below and/or in connection with one or more other processes described elsewhere herein.

In a first aspect, the indication of the per-beam CBR is received from the sidelink receiver or from a base station configured to relay the indication of the per-beam CBR from the sidelink receiver.

In a second additional aspect, alone or in combination with the first aspect, process 600 includes receiving a UE identifier of the sidelink receiver and a beam identifier of the per-beam CBR.

In a third additional aspect, alone or in combination with one or more of the first and second aspects, the sidelink receiver is configured to periodically measure and transmit the indication of the per-beam CBR, wherein a periodicity of the measurement of the per-beam CBR or the transmission of the indication of the per-beam CBR depends on the beam.

In a fourth additional aspect, alone or in combination with one or more of the first through third aspects, the sidelink transmitter periodically receives the indication of the per-beam CBR, wherein a periodicity of the reception of the indication of the per-beam CBR depends on the beam.

In a fifth additional aspect, alone or in combination with one or more of the first through fourth aspects, receiving the indication of the per-beam CBR associated with the beam comprises: determining information identifying a particular set of time-frequency resources as a set of time-frequency resources that corresponds to the beam, and receiving the indication of the per-beam CBR in the particular set of time-frequency resources that corresponds to the beam.

In a sixth additional aspect, alone or in combination with one or more of the first through fifth aspects, the sidelink receiver and the sidelink transmitter have common timing.

In a seventh additional aspect, alone or in combination with one or more of the first through sixth aspects, the per-beam CBR includes a plurality of CBRs for the first beam, each associated with a different threshold.

In an eighth additional aspect, alone or in combination with one or more of the first through seventh aspects, the plurality of CBRs is a subset of CBRs from another plurality of CBRs for the first beam.

In a ninth additional aspect, alone or in combination with one or more of the first through eighth aspects, the subset of CBRs is based at least in part on at least one of: an instruction received from a base station, a priority of the sidelink transmission, or a priority of the sidelink transmitter.

In a tenth additional aspect, alone or in combination with one or more of the first through ninth aspects, the first CBR is associated with a threshold selected for assessing busyness for a wide beam.

In an eleventh additional aspect, alone or in combination with one or more of the first through tenth aspects, the first CBR is associated with a threshold selected for assessing busyness for a narrow beam.

In a twelfth additional aspect, alone or in combination with one or more of the first through eleventh aspects, the per-beam CBR includes a second CBR for a second beam, wherein the first CBR is associated with a first threshold and the second CBR is associated with a second threshold that is different from the first threshold.

Figure 8:
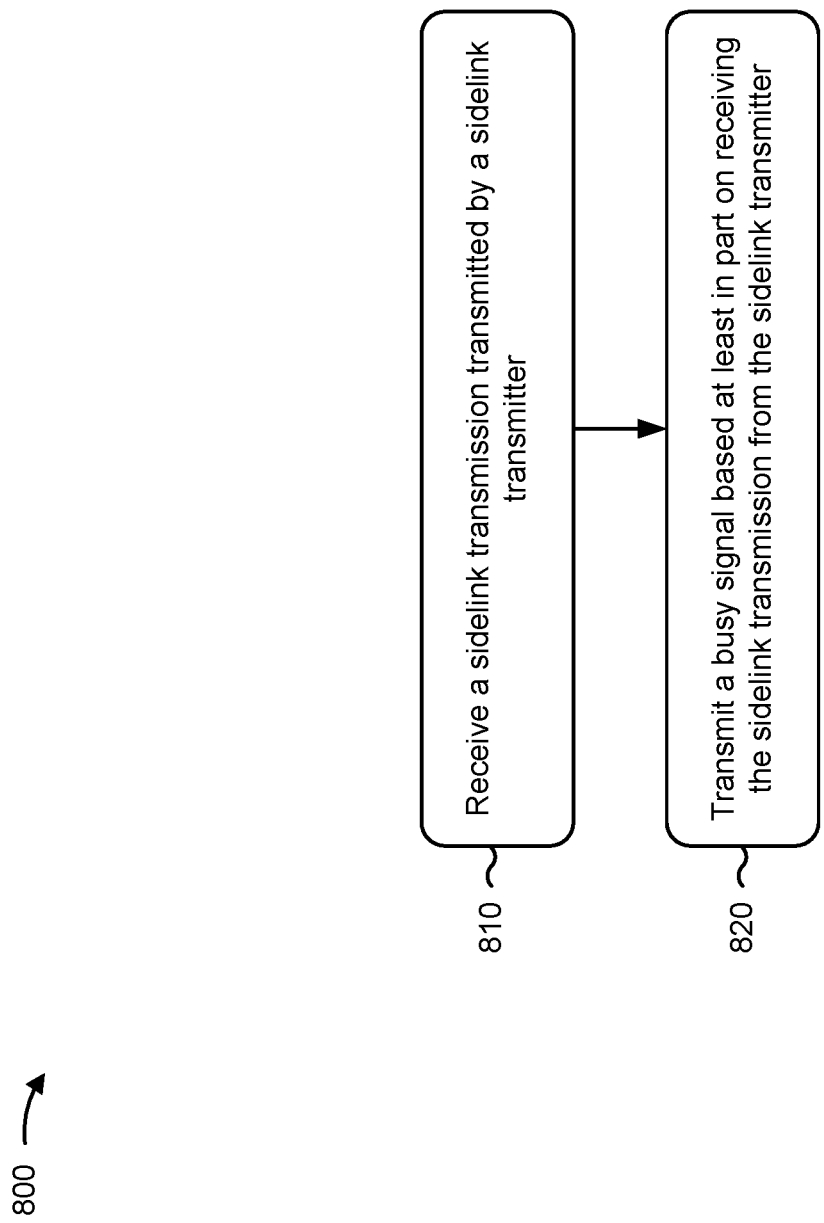

FIG. 8 is a diagram illustrating an example process 800 performed, for example, by a sidelink receiver, in accordance with various aspects of the present disclosure. Example process 800 is an example where a sidelink receiver (for example, UE 120) performs operations associated with beamformed CBR.

As shown in FIG. 8, in some aspects, process 800 may include receiving a sidelink transmission transmitted by a sidelink transmitter (block 810). For example, the sidelink receiver (for example, using receive processor 258, controller/processor 280, memory 282) may receive a sidelink transmission transmitted by a sidelink transmitter, as described above.

As further shown in FIG. 8, in some aspects, process 800 may include transmitting a busy signal based at least in part on receiving the sidelink transmission from the sidelink transmitter (block 820). For example, the sidelink receiver (for example, using transmit processor 264, controller/processor 280, memory 282) may transmit a busy signal based at least in part on receiving the sidelink transmission from the sidelink transmitter, as described above. In some aspects, the busy signal indicates that a channel associated with the sidelink transmission is busy or is occupied. In some aspects, the busy signal is transmitted in a time period during which the sidelink receiver is receiving the sidelink transmission from the sidelink transmitter.

Process 800 may include additional aspects, such as any single aspect or any combination of aspects described below and/or in connection with one or more other processes described elsewhere herein.

In a first aspect, a frequency of the busy signal indicates a frequency band associated with the sidelink transmission.

In a second aspect, alone or in combination with the first aspect, a codeword or a sequence transmitted in the busy signal indicates occupancy of a set of resources of a frequency band associated with the sidelink transmission.

In a third aspect, alone or in combination with one or more of the first and second aspects, a frequency band of the busy signal overlaps with a frequency band associated with the sidelink transmission.

In a fourth aspect, alone or in combination with one or more of the first through third aspects, the busy signal is frequency division multiplexed with a frequency band associated with the sidelink transmission.

In a fifth aspect, alone or in combination with one or more of the first through fourth aspects, a beam or a panel on which the busy signal is transmitted is different from a beam or a panel on which the sidelink transmission is being received.

In a sixth aspect, alone or in combination with one or more of the first through fifth aspects, the busy signal is transmitted on multiple beams or on multiple panels.

In a seventh aspect, alone or in combination with one or more of the first through sixth aspects, a beam on which the busy signal is transmitted has a different characteristic than the beam on which the sidelink transmission is received.

In an eighth aspect, alone or in combination with one or more of the first through seventh aspects, the busy signal indicates a receive beam used to receive the sidelink transmission. In some aspects, the receive beam is identified with respect to a sidelink synchronization beam.

In a ninth aspect, alone or in combination with one or more of the first through eighth aspects, the busy signal indicates a direction of a receive beam used to receive the sidelink transmission.

In a tenth aspect, alone or in combination with one or more of the first through ninth aspects, the sidelink receiver and the sidelink transmitter are UEs (for example, UEs 120).

In an eleventh aspect, alone or in combination with one or more of the first through tenth aspects, the sidelink receiver and the sidelink transmitter are IAB nodes.

In a twelfth aspect, alone or in combination with one or more of the first through eleventh aspects, the busy signal indicates an identity of the sidelink receiver, such as a UE identifier.

Figure 9:
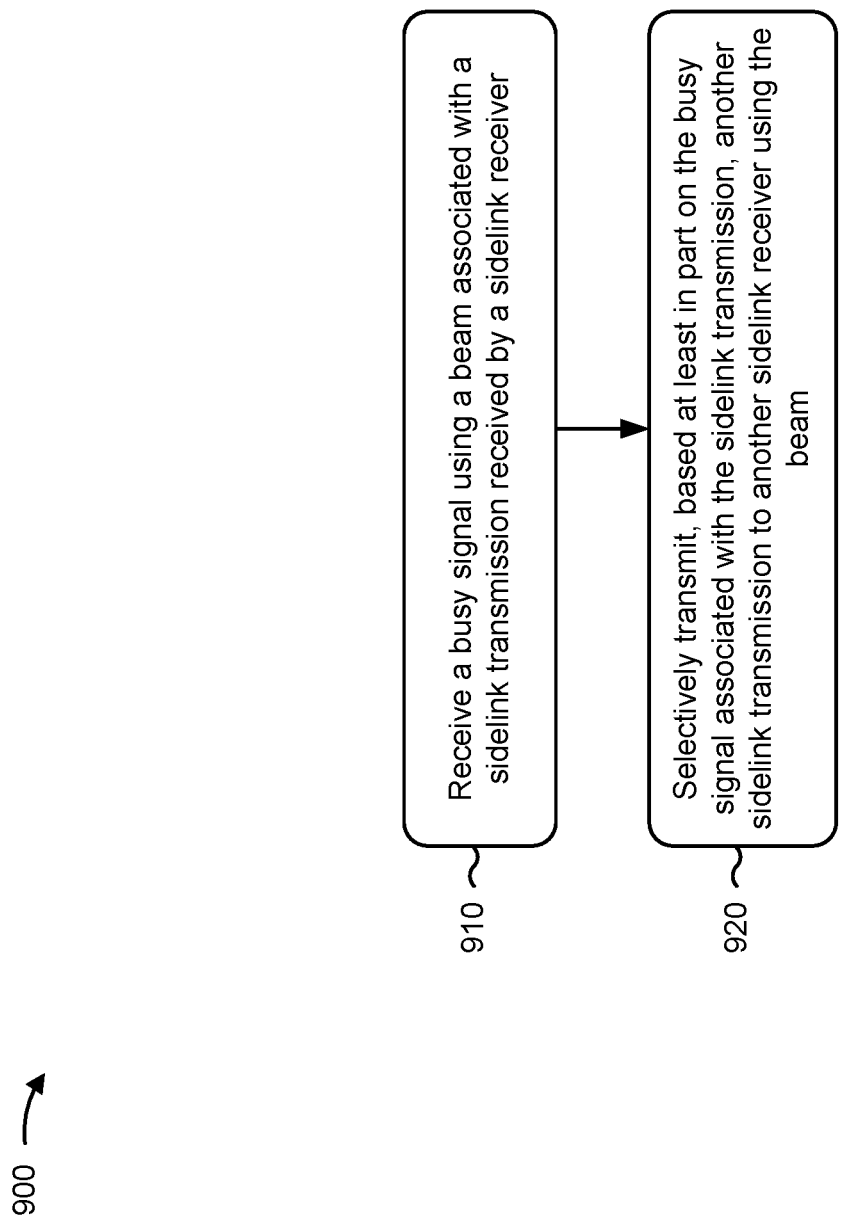

FIG. 9 is a diagram illustrating an example process 900 performed, for example, by a sidelink transmitter, in accordance with various aspects of the present disclosure. Example process 900 is an example where a sidelink transmitter (for example, UE 120) performs operations associated with beamformed CBR.

As shown in FIG. 9, in some aspects, process 900 may include receiving a busy signal using a beam associated with a sidelink transmission received by a sidelink receiver (block 910). For example, the sidelink transmitter (for example, using receive processor 258, controller/processor 280, memory 282) may receive a busy signal using a beam associated with a sidelink transmission received by a sidelink receiver, as described above. In some aspects, the busy signal indicates that a channel associated with the sidelink transmission is busy or is occupied. In some aspects, the busy signal is received in a time period during which the sidelink receiver is receiving the sidelink transmission.

As further shown in FIG. 9, in some aspects, process 900 may include selectively transmitting, based at least in part on the busy signal associated with the sidelink transmission, another sidelink transmission to another sidelink receiver using the beam (block 920). For example, the sidelink transmitter (for example, using transmit processor 264, controller/processor 280, memory 282) may selectively transmit, based at least in part on the busy signal associated with the sidelink transmission, another sidelink transmission to another sidelink receiver using the beam, as described above.

Process 900 may include additional aspects, such as any single aspect or any combination of aspects described below and/or in connection with one or more other processes described elsewhere herein.

In a first aspect, a frequency of the busy signal indicates a frequency band associated with the sidelink transmission.

In a second aspect, alone or in combination with the first aspect, a codeword or a sequence received in the busy signal indicates occupancy of a set of resources of a frequency band associated with the sidelink transmission.

In a third aspect, alone or in combination with one or more of the first and second aspects, a frequency band of the busy signal overlaps with a frequency band associated with the sidelink transmission.

In a fourth aspect, alone or in combination with one or more of the first through third aspects, the busy signal is frequency division multiplexed with a frequency band associated with the sidelink transmission.

In a fifth aspect, alone or in combination with one or more of the first through fourth aspects, the busy signal indicates a receive beam used to receive the sidelink transmission. In some aspects, the receive beam is identified with respect to a sidelink synchronization beam.

In a sixth aspect, alone or in combination with one or more of the first through fifth aspects, the busy signal indicates a direction of a receive beam used to receive the sidelink transmission.

In a seventh aspect, alone or in combination with one or more of the first through sixth aspects, the sidelink receiver, the other sidelink receiver, and the sidelink transmitter are UEs (for example, UEs 120).

In an eighth aspect, alone or in combination with one or more of the first through seventh aspects, the sidelink receiver, the other sidelink receiver, and the sidelink transmitter are IAB nodes.

In a ninth aspect, alone or in combination with one or more of the first through eighth aspects, the busy signal indicates an identity of the sidelink receiver.

In a tenth aspect, alone or in combination with one or more of the first through ninth aspects, a per-beam CBR for a receive beam to be used by the other sidelink receiver for receiving the other sidelink transmission from the sidelink transmitter is computed based at least in part on the busy signal.

Figure 10:
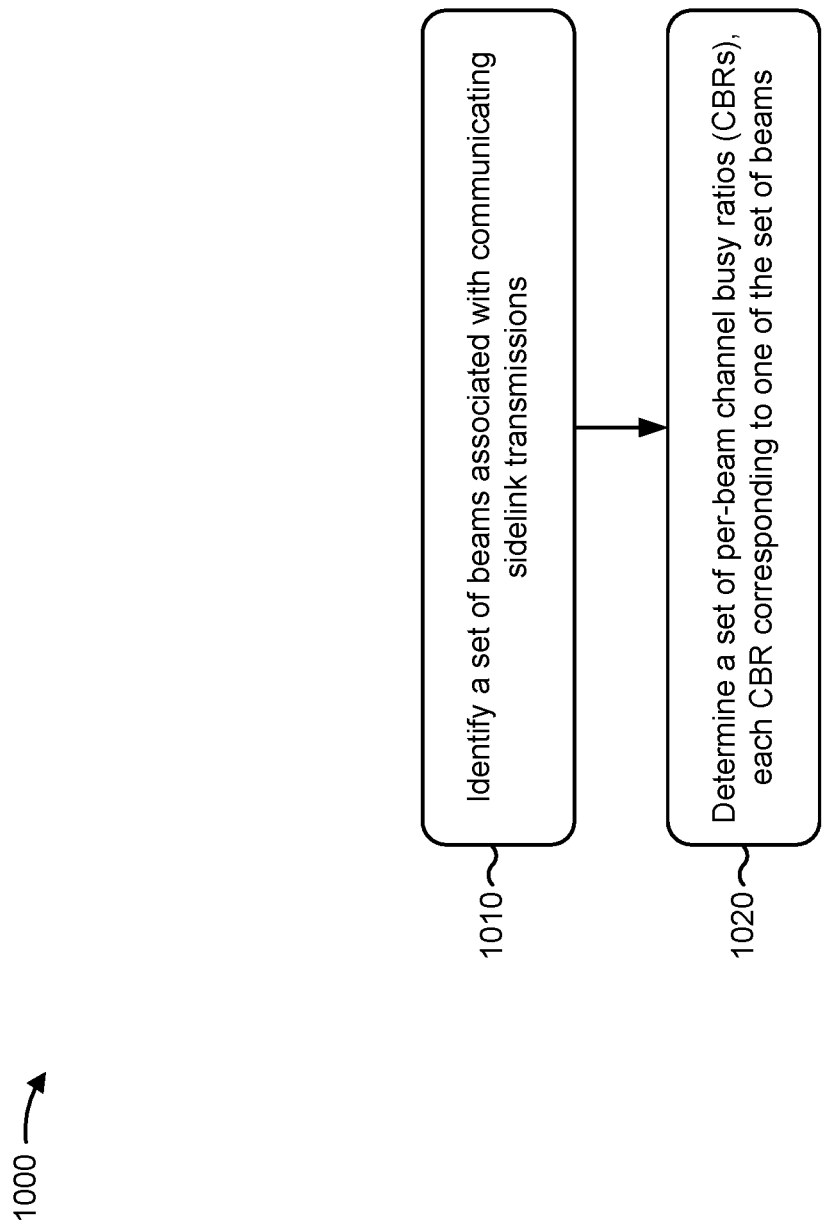

FIG. 10 is a diagram illustrating an example process 1000 performed, for example, by a sidelink device, in accordance with various aspects of the present disclosure. Example process 1000 is an example where a sidelink device (for example, UE 120) performs operations associated with beamformed CBR.

As shown in FIG. 10, in some aspects, process 1000 may include identifying a set of beams associated with communicating sidelink transmissions (block 1010). For example, the sidelink device (for example, using receive/transmit processor 258/264 controller/processor 280, memory 282) may identify a set of beams associated with communicating sidelink transmissions, as described above.

As further shown in FIG. 10, in some aspects, process 1000 may include determining a set of per-beam CBRs, each CBR corresponding to one of the set of beams (block 1020). For example, the sidelink device (for example, using receive/transmit processor 258/264, controller/processor 280, memory 282) may determine a set of per-beam CBRs, each CBR corresponding to one of the set of beams, as described above.

Figure 11:
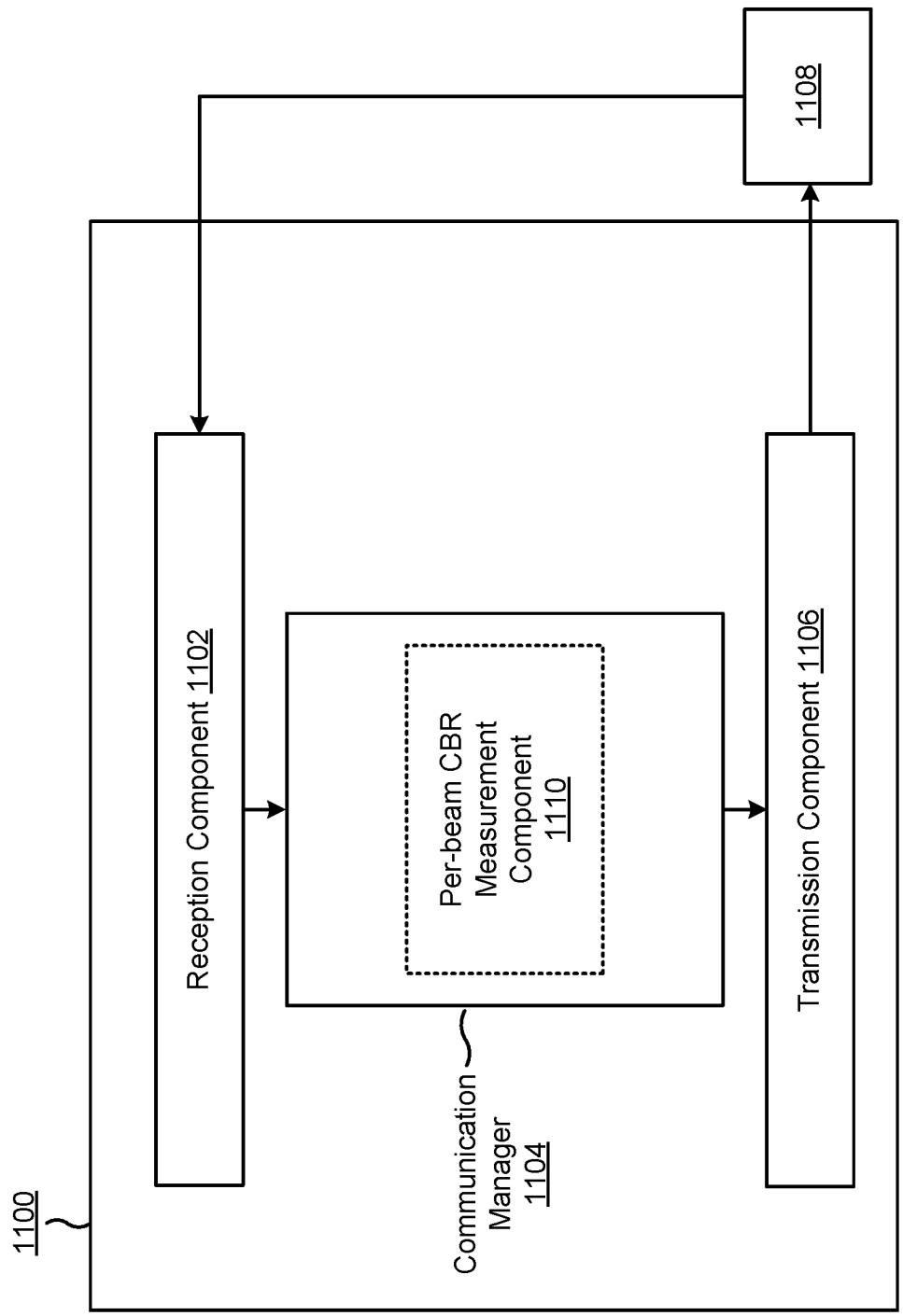
FIGS. 11-15 are block diagrams of example apparatuses for wireless communication in accordance with various aspects of the present disclosure.

FIG. 11 is a block diagram of an example apparatus 1100 for wireless communication. The apparatus 1100 may be a sidelink receiver (for example, a UE, a base station, an IAB node, or the like), or a sidelink receiver may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a sidelink transmitter, which may include a UE, a base station, an IAB node, or another wireless communication device) using the reception component 1102 and the transmission component 1106.

In some aspects, the apparatus 1100 may be configured to perform one or more operations described herein in connection with FIGS. 3 and 4. Additionally or alternatively, the apparatus 1100 may be configured to perform one or more processes described herein, such as process 600 of FIG. 6. In some aspects, the apparatus 1100 may include one or more components of the UE 120 described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the sidelink receiver described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the sidelink receiver described above in connection with FIG. 2. In some aspects, the transmission component 1106 may be collocated with the reception component 1102 in a transceiver.

The communication manager 1104 may measure a per-beam CBR for each of one or more beams configured on the sidelink receiver for transmitting or receiving sidelink transmissions including a first CBR for a first beam that is to be used for receiving a sidelink transmission transmitted by a first sidelink transmitter, and may transmit or may cause the transmission component 1106 to transmit an indication of the per-beam CBR for each of the one or more of the beams including the first CBR for the first beam. In some aspects, the communication manager 1104 may include a controller/processor, a memory, a scheduler, a communication unit, or a combination thereof, of the UE 120 or the base station 110 described above in connection with FIG. 2.

In some aspects, the communication manager 1104 may include a set of components, such as a per-beam CBR measurement component 1110. Alternatively, the set of components may be separate and distinct from the communication manager 1104. In some aspects, one or more components of the set of components may include or may be implemented within a controller/processor, a memory, a scheduler, a communication unit, or a combination thereof, of the UE 120 or the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The per-beam CBR measurement component 1110 may measure a per-beam CBR corresponding to a beam to be used for receiving a sidelink transmission transmitted by a sidelink transmitter, as described herein. In some aspects, the transmission component 1106 may transmit indication of the per-beam CBR for each of the one or more of the beams including the first CBR for the first beam, as described herein.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
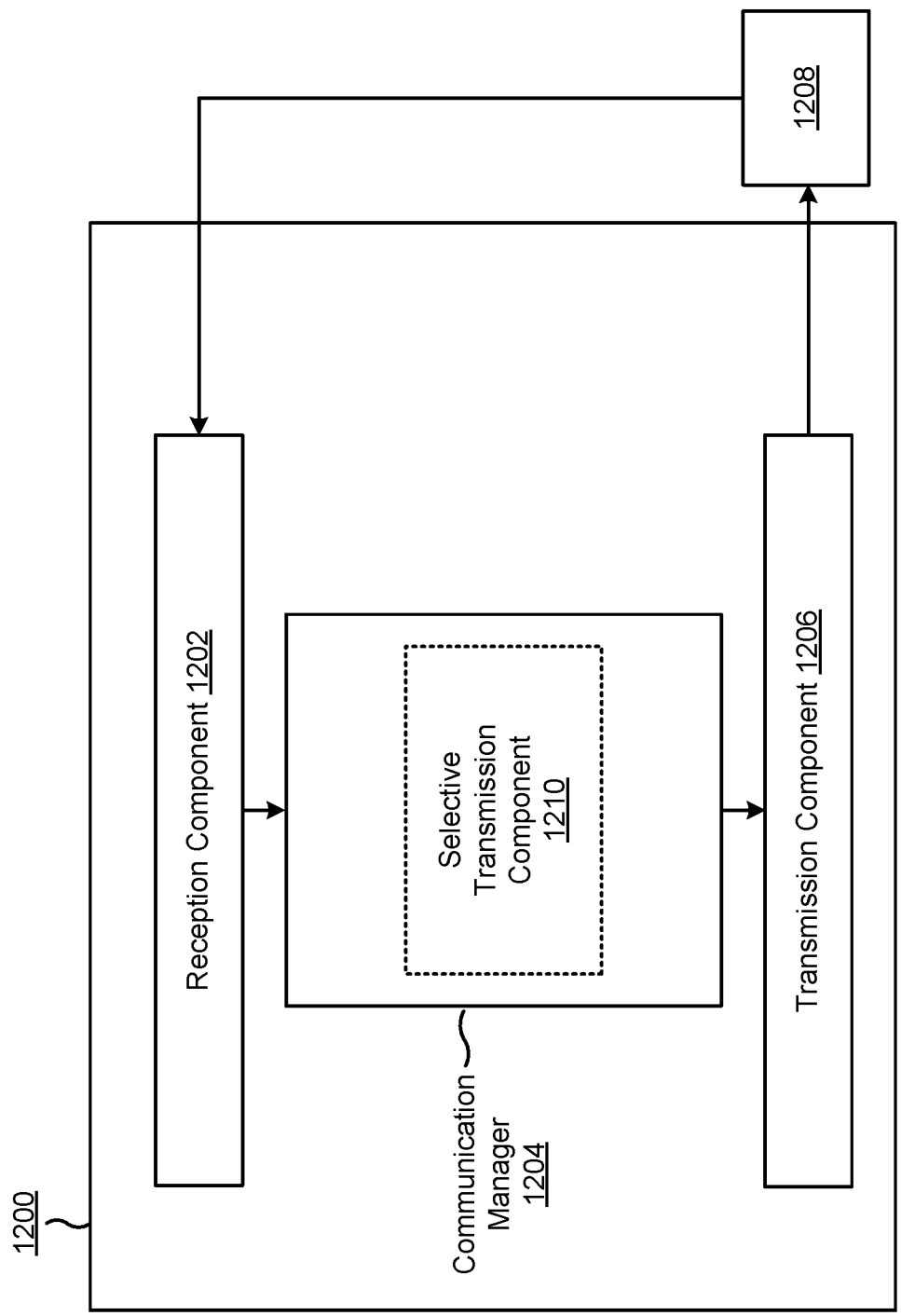

FIG. 12 is a block diagram of an example apparatus 1200 for wireless communication. The apparatus 1200 may be a sidelink transmitter (for example, a UE 120, a base station 110, an IAB node, or the like), or a sidelink transmitter may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a sidelink receiver, which may include a UE, a base station, an IAB node, or another wireless communication device) using the reception component 1202 and the transmission component 1206.

In some aspects, the apparatus 1200 may be configured to perform one or more operations described herein in connection with FIGS. 3 and 4. Additionally or alternatively, the apparatus 1200 may be configured to perform one or more processes described herein, such as process 700 of FIG. 7. In some aspects, the apparatus 1200 may include one or more components of the UE 120 or the base station 110 described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the sidelink transmitter described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the sidelink transmitter described above in connection with FIG. 2. In some aspects, the transmission component 1206 may be collocated with the reception component 1202 in a transceiver.

The communication manager 1204 may receive an indication of a per-beam CBR including a first CBR for a first beam to be used by a sidelink receiver for receiving a sidelink transmission transmitted by the sidelink transmitter, and may selectively transmit or may cause transmission component 1206 to selectively transmit the sidelink transmission for reception by sidelink receiver using the first beam based at least in part on the indication of the per-beam CBR. In some aspects, the communication manager 1204 may include a controller/processor, a memory, a scheduler, a communication unit, or a combination thereof, of the UE 120 or the base station 110 described above in connection with FIG. 2.

In some aspects, the communication manager 1204 may include a set of components, such as a selective transmission component 1210. Alternatively, the set of components may be separate and distinct from the communication manager 1204. In some aspects, one or more components of the set of components may include or may be implemented within a controller/processor, a memory, a scheduler, a communication unit, or a combination thereof, of the UE 120 or the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1202 may receive an indication of a a per-beam CBR including a first CBR for a first beam to be used by a sidelink receiver for receiving a sidelink transmission transmitted by the sidelink transmitter, as described herein. In some aspects, the selective transmission component 1210 may selectively transmit the sidelink transmission for reception by sidelink receiver using the first beam based at least in part on the indication of the per-beam CBR, as described herein.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
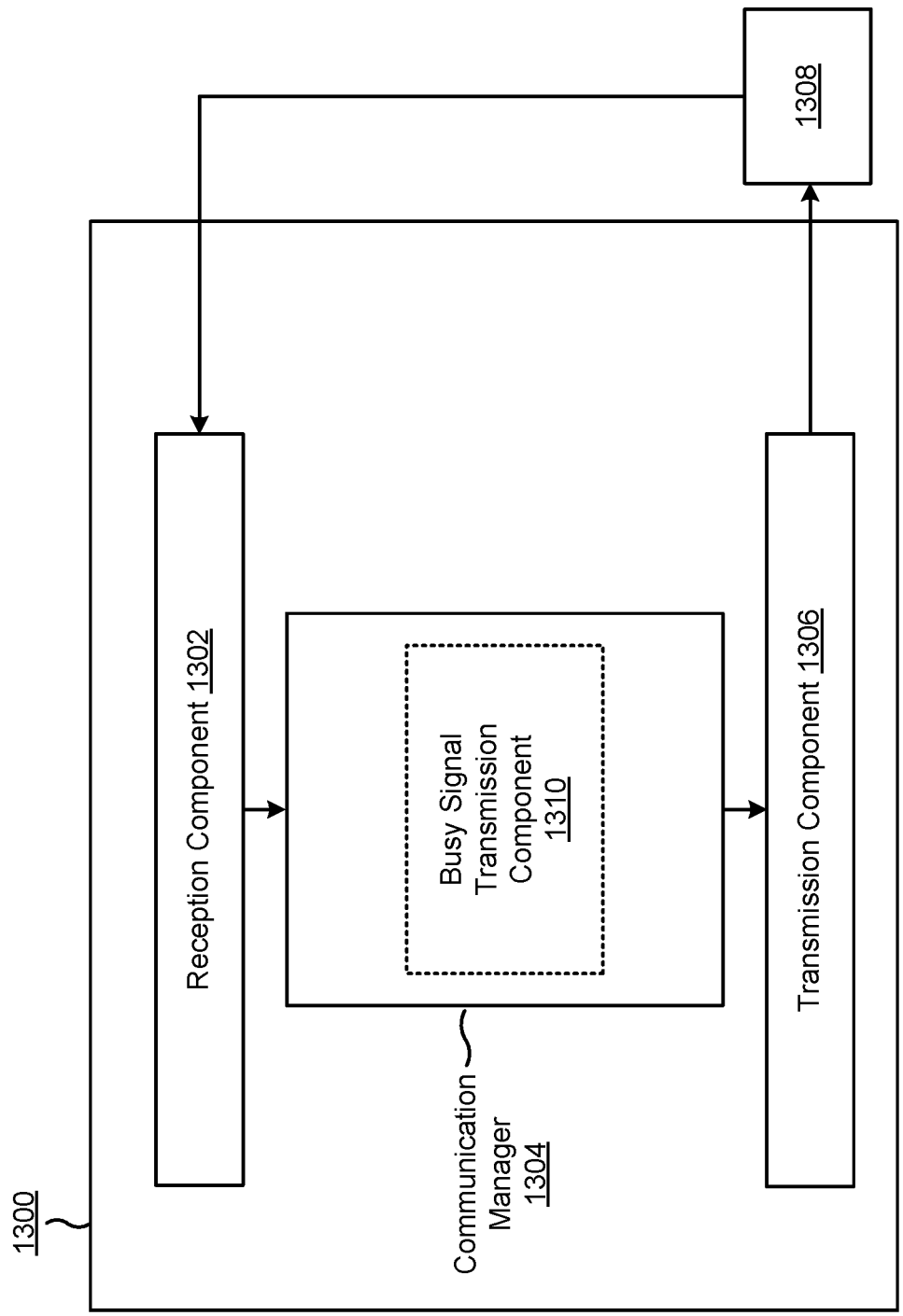

FIG. 13 is a block diagram of an example apparatus 1300 for wireless communication. The apparatus 1300 may be a sidelink receiver (for example, a UE 120, a base station 110, an IAB node, or the like), or a sidelink receiver may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a sidelink transmitter, which may include a UE, a base station, an IAB node, or another wireless communication device) using the reception component 1302 and the transmission component 1306.

In some aspects, the apparatus 1300 may be configured to perform one or more operations described herein in connection with FIG. 5. Additionally or alternatively, the apparatus 1300 may be configured to perform one or more processes described herein, such as process 800 of FIG. 8. In some aspects, the apparatus 1300 may include one or more components of the UE 120 or the base station 110 described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the sidelink receiver described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the sidelink receiver described above in connection with FIG. 2. In some aspects, the transmission component 1306 may be collocated with the reception component 1302 in a transceiver.

The communication manager 1304 may receive or may cause reception component 1302 to receive a sidelink transmission transmitted by a sidelink transmitter, and may transmit busy signal while receiving the sidelink transmission from the sidelink transmitter. In some aspects, the communication manager 1304 may include a controller/processor, a memory, a scheduler, a communication unit, or a combination thereof, of the UE 120 or the base station 110 described above in connection with FIG. 2.

In some aspects, the communication manager 1304 may include a set of components, such as a busy signal transmission component 1310. Alternatively, the set of components may be separate and distinct from the communication manager 1304. In some aspects, one or more components of the set of components may include or may be implemented within a controller/processor, a memory, a scheduler, a communication unit, or a combination thereof, of the UE 120 or the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1302 may receive a sidelink transmission transmitted by a sidelink transmitter, as described herein. In some aspects, the busy signal transmission component 1310 may transmit or may cause the transmission component 1306 to transmit a busy signal while the reception component 1302 is receiving the sidelink transmission from the sidelink transmitter, as described herein.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
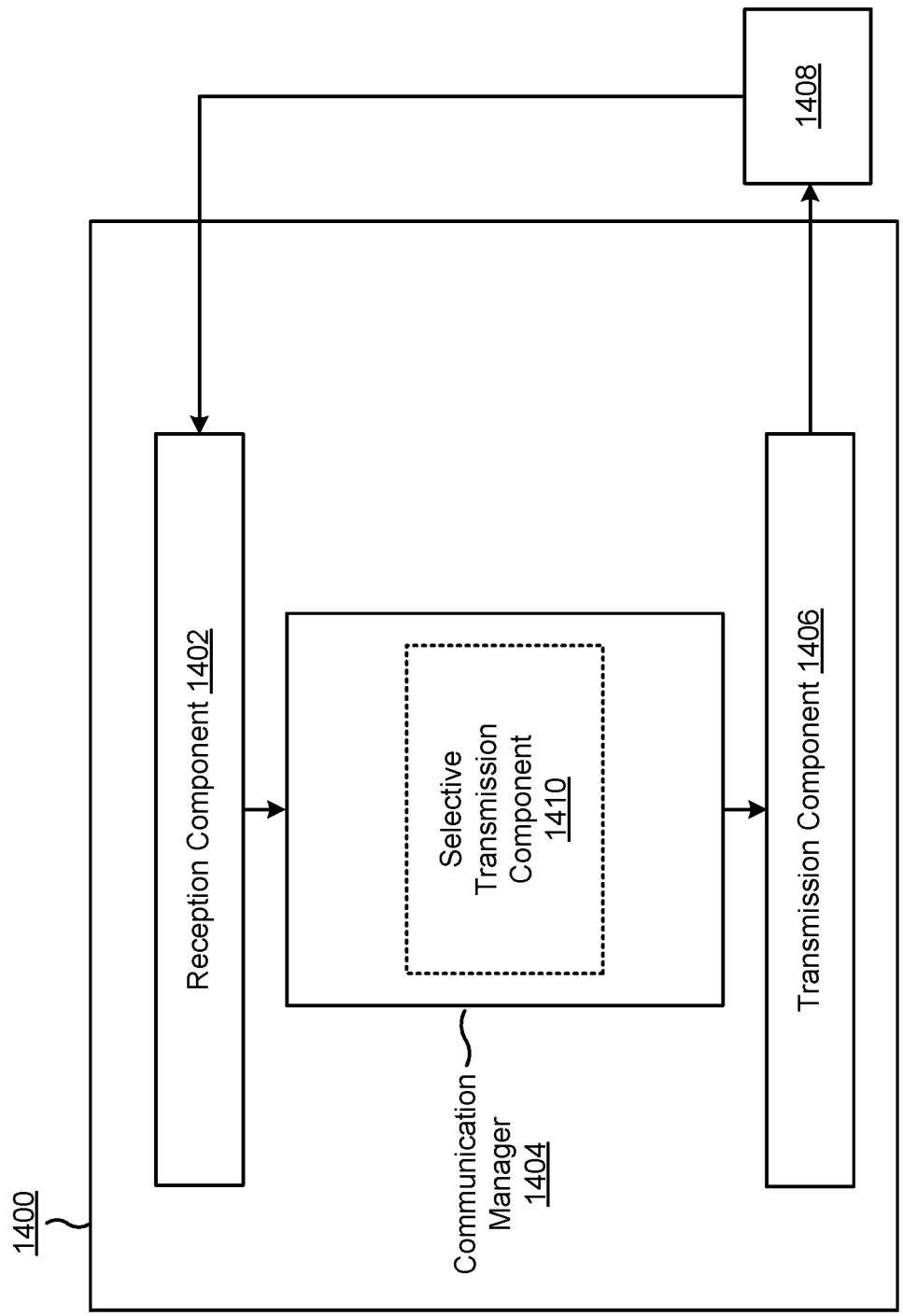

FIG. 14 is a block diagram of an example apparatus 1400 for wireless communication. The apparatus 1400 may be a sidelink transmitter (for example, a UE 120, a base station 110, an IAB node, or the like), or a sidelink transmitter may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a sidelink receiver, which may include a UE, a base station, an IAB node, or another wireless communication device) using the reception component 1402 and the transmission component 1406.

In some aspects, the apparatus 1400 may be configured to perform one or more operations described herein in connection with FIG. 5. Additionally or alternatively, the apparatus 1400 may be configured to perform one or more processes described herein, such as process 900 of FIG. 9. In some aspects, the apparatus 1400 may include one or more components of the UE 120 or the base station 110 described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the sidelink transmitter described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the sidelink transmitter described above in connection with FIG. 2. In some aspects, the transmission component 1406 may be collocated with the reception component 1402 in a transceiver.

The communication manager 1404 may receive or may cause reception component 1402 to receive a busy signal using a beam associated with a sidelink transmission received by a sidelink receiver, and may selectively transmit or may cause transmission component 1406 to selectively transmit, based at least in part on the busy signal associated with the sidelink transmission, another sidelink transmission to another sidelink receiver using the beam. In some aspects, the communication manager 1404 may include a controller/processor, a memory, a scheduler, a communication unit, or a combination thereof, of the UE 120 or the base station 110 described above in connection with FIG. 2.

In some aspects, the communication manager 1404 may include a set of components, such as a selective transmission component 1410. Alternatively, the set of components may be separate and distinct from the communication manager 1404. In some aspects, one or more components of the set of components may include or may be implemented within a controller/processor, a memory, a scheduler, a communication unit, or a combination thereof, of the UE 120 or the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1402 may receive a busy signal using a beam associated with a sidelink transmission received by a sidelink receiver, as described herein. In some aspects, the selective transmission component 1410 may selectively transmit, based at least in part on the busy signal associated with the sidelink transmission, another sidelink transmission to another sidelink receiver using the beam, as described herein.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
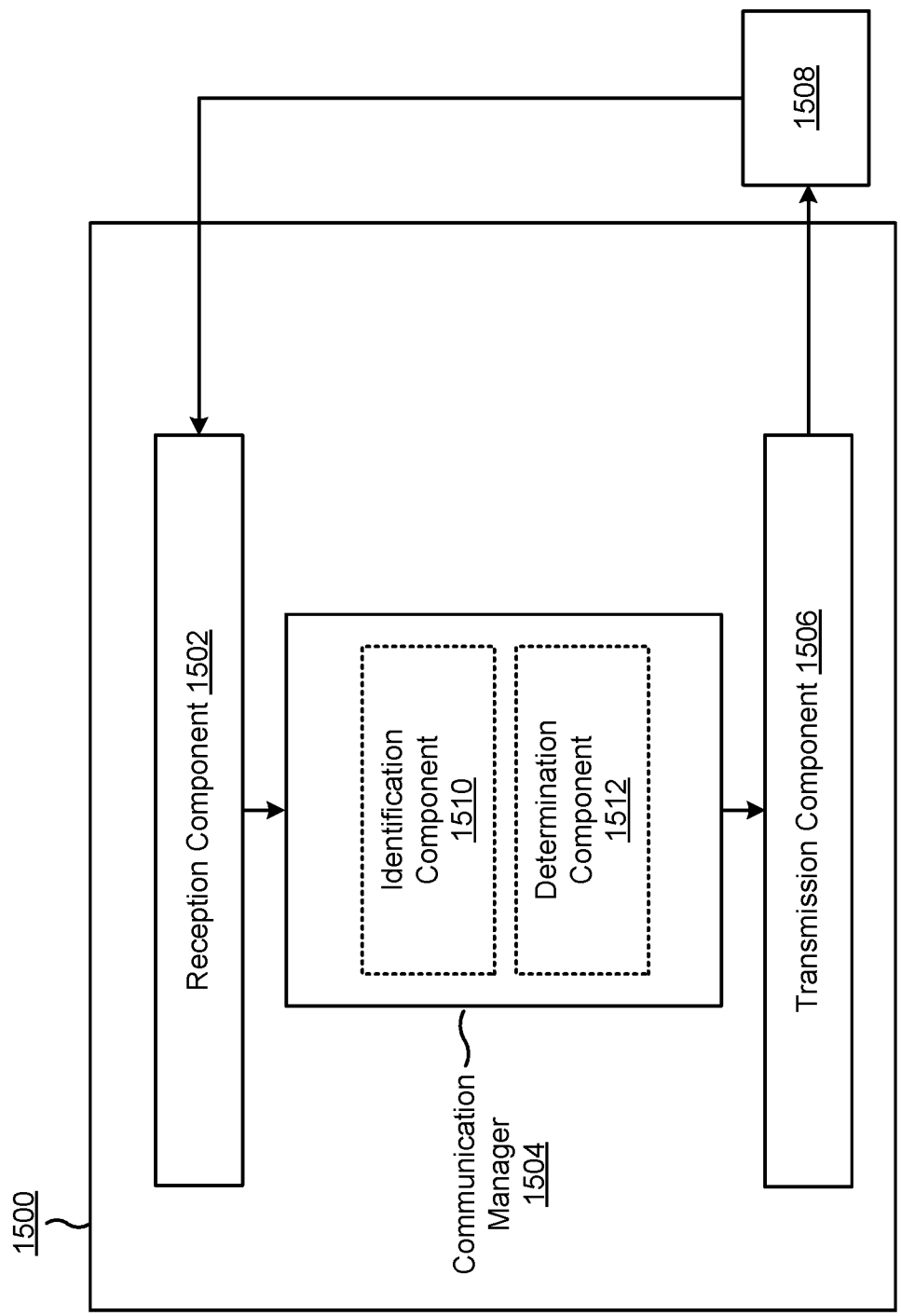

FIG. 15 is a block diagram of an example apparatus 1500 for wireless communication. The apparatus 1500 may be a sidelink device (for example, a sidelink receiver or a sidelink transmitter, either of which may include a UE 120, a base station 110, an IAB node, or the like), or a sidelink device may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as another sidelink device, which may include a UE, a base station, an IAB node, or another wireless communication device) using the reception component 1502 and the transmission component 1506.

In some aspects, the apparatus 1500 may be configured to perform one or more operations described herein in connection with FIGS. 3-5. Additionally or alternatively, the apparatus 1500 may be configured to perform one or more processes described herein, such as process 1000 of FIG. 10. In some aspects, the apparatus 1500 may include one or more components of the UE 120 or the base station 110 described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the sidelink device described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the sidelink device described above in connection with FIG. 2. In some aspects, the transmission component 1506 may be collocated with the reception component 1502 in a transceiver.

The communication manager 1504 may identify a set of beams associated with communicating sidelink transmissions, and may determine a set of per-beam CBRs, each CBR corresponding to one of the set of beams. In some aspects, the communication manager 1504 may include a controller/processor, a memory, a scheduler, a communication unit, or a combination thereof, of the UE 120 or the base station 110 described above in connection with FIG. 2.

In some aspects, the communication manager 1504 may include a set of components, such as an identification component 1510, a determination component 1512, or a combination thereof. Alternatively, the set of components may be separate and distinct from the communication manager 1504. In some aspects, one or more components of the set of components may include or may be implemented within a controller/processor, a memory, a scheduler, a communication unit, or a combination thereof, of the UE 120 or the base station 110 described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the identification component 1510 may identify a set of beams associated with communicating sidelink transmissions, as described herein. In some aspects, the determination component 1512 may determine a set of per-beam CBRs, each CBR corresponding to one of the set of beams, as described herein.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a sidelink receiver, comprising:
   receiving an indication that a first sidelink transmitter is to transmit a sidelink transmission to the sidelink receiver;
   measuring, based at least in part on the indication that the first sidelink transmitter is to transmit the sidelink transmission to the sidelink receiver, a per-beam channel busy ratio (CBR) for each of one or more beams configured on the sidelink receiver for transmitting or receiving sidelink transmissions including a first CBR for a first beam that is to be used for receiving the sidelink transmission; and
   transmitting, to a network entity for relay to the first sidelink transmitter, an indication of the per-beam CBR for each of the one or more beams including the first CBR for the first beam.

2. The method of claim 1, further comprising receiving the sidelink transmission using the first beam based at least in part on transmitting the indication of the per-beam CBR for each of the one or more beams.

3. The method of claim 1, wherein the indication of the per-beam CBR for each of the one or more beams is transmitted to a set of sidelink transmitters including the first sidelink transmitter.

4. The method of claim 3, further comprising transmitting a set of user equipment (UE) identifiers corresponding to the set of sidelink transmitters.

5. The method of claim 1, further comprising transmitting a user equipment (UE) identifier of the sidelink receiver and a beam identifier of the per-beam CBR for each of the one or more beams.

6. The method of claim 1, wherein the sidelink receiver is configured to periodically measure the per-beam CBR for each of the one or more beams and transmit the indication of the per-beam CBR for each of the one or more beams, wherein a periodicity of the measurement of the per-beam CBR for each of the one or more beams or the transmission of the indication of the per-beam CBR for each of the one or more beams depends on the first beam.

7. The method of claim 1, wherein transmitting the indication of the per-beam CBR for each of the one or more beams comprises:
   determining information identifying a particular set of time-frequency resources that corresponds to the first beam; and
   transmitting the indication of the per-beam CBR for each of the one or more beams in the particular set of time-frequency resources.

8. The method of claim 1, wherein the sidelink receiver and the first sidelink transmitter have common timing.

9. The method of claim 1, wherein measuring the per-beam CBR for each of the one or more beams includes measuring a plurality of CBRs for the first beam, each of the plurality of CBRs for the first beam being associated with a different threshold.

10. The method of claim 9, wherein the transmitted indication of the per-beam CBR for each of the one or more beams includes an indication of each CBR of the plurality of CBRs for the first beam.

11. The method of claim 9, wherein the transmitted indication of the per-beam CBR for each of the one or more beams includes an indication of a subset of CBRs that is selected from the plurality of CBRs for the first beam.

12. The method of claim 11, wherein the subset of CBRs is selected based at least in part on at least one of:
   an instruction received from the network entity,
   a priority of the sidelink transmission, or
   a priority of the first sidelink transmitter.

13. The method of claim 1, wherein the first CBR is associated with a threshold selected for assessing busyness for a wide beam.

14. The method of claim 1, wherein the first CBR is associated with a threshold selected for assessing busyness for a narrow beam.

15. The method of claim 1, wherein the per-beam CBR for each of the one or more beams includes a second CBR for a second beam of the one or more beams, wherein the first CBR is associated with a first threshold and the second CBR is associated with a second threshold that is different from the first threshold.

16. A method of wireless communication performed by a sidelink transmitter, comprising:
   transmitting an indication that the sidelink transmitter is to transmit a sidelink transmission to a sidelink receiver;
   receiving, from a network entity configured to relay information from the sidelink receiver to the sidelink transmitter and based at least in part on the indication that the sidelink transmitter is to transmit the sidelink transmission to the sidelink receiver, an indication of a per-beam channel busy ratio (CBR) including a first CBR for a first beam to be used by the sidelink receiver for receiving the sidelink transmission; and
   selectively transmitting the sidelink transmission for reception by the sidelink receiver using the first beam based at least in part on the indication of the per-beam CBR.

17. The method of claim 16, wherein the indication of the per-beam CBR is received from the sidelink receiver or from the network entity.

18. The method of claim 16, further comprising receiving a user equipment (UE) identifier of the sidelink receiver and a beam identifier of the per-beam CBR.

19. The method of claim 16, wherein the sidelink receiver is configured to periodically measure and transmit the indication of the per-beam CBR, wherein a periodicity of the measurement of the per-beam CBR or the transmission of the indication of the per-beam CBR depends on the first beam.

20. The method of claim 16, further comprising periodically receiving the indication of the per-beam CBR, wherein a periodicity of the reception of the indication of the per-beam CBR depends on the first beam.

21. The method of claim 16, wherein receiving the indication of the per-beam CBR comprises:
   determining information identifying a particular set of time-frequency resources as a set of time-frequency resources that corresponds to the first beam; and receiving the indication of the per-beam CBR in the particular set of time-frequency resources that corresponds to the first beam.

22. The method of claim 16, wherein the sidelink receiver and the sidelink transmitter have common timing.

23. The method of claim 16, wherein the per-beam CBR includes a plurality of CBRs for the first beam, each of the plurality of CBRs being associated with a different threshold.

24. The method of claim 23, wherein the plurality of CBRs is a subset of CBRs from another plurality of CBRs for the first beam.

25. The method of claim 24, wherein the subset of CBRs is based at least in part on at least one of:
   an instruction received from the network entity,
   a priority of the sidelink transmission, or
   a priority of the sidelink transmitter.

26. The method of claim 16, wherein the first CBR is associated with a threshold selected for assessing busyness for a wide beam.

27. The method of claim 16, wherein the first CBR is associated with a threshold selected for assessing busyness for a narrow beam.

28. The method of claim 16, wherein the per-beam CBR includes a second CBR for a second beam, wherein the first CBR is associated with a first threshold and the second CBR is associated with a second threshold that is different from the first threshold.

29. A method of wireless communication performed by a sidelink receiver, comprising:
   receiving a sidelink transmission transmitted by a first sidelink transmitter; and
   transmitting a busy signal to a second sidelink transmitter based at least in part on receiving the sidelink transmission from the first sidelink transmitter, the busy signal indicating that a channel associated with the sidelink transmission is busy or is occupied, the busy signal being transmitted to the second sidelink transmitter in a time period during which the sidelink receiver is receiving the sidelink transmission from the first sidelink transmitter, and a frequency of the busy signal indicating a frequency band associated with the sidelink transmission.

30. The method of claim 16, wherein transmitting the indication that the sidelink transmitter is to transmit the sidelink transmission to the sidelink receiver comprises transmitting, via the network entity, the indication that the sidelink transmitter is to transmit the sidelink transmission to the sidelink receiver.

31. The method of claim 1, wherein receiving the indication that the first sidelink transmitter is to transmit the sidelink transmission to the sidelink receiver comprises receiving, from the first sidelink transmitter via the network entity, the indication that the first sidelink transmitter is to transmit the sidelink transmission to the sidelink receiver.

* * * * *